United States Patent
Matsui et al.

(10) Patent No.: US 7,296,593 B2
(45) Date of Patent: Nov. 20, 2007

(54) OPENING AND CLOSING VALVE

(75) Inventors: Hideyuki Matsui, Kitakyushu (JP); Osamu Tokunaga, Kitakyushu (JP)

(73) Assignee: Toto Ltd. (JP)

( * ) Notice: Subject to any disclaimer, the term of this patent is extended or adjusted under 35 U.S.C. 154(b) by 191 days.

(21) Appl. No.: 10/525,994

(22) PCT Filed: Sep. 1, 2003

(86) PCT No.: PCT/JP03/11158

§ 371 (c)(1),
(2), (4) Date: Sep. 22, 2005

(87) PCT Pub. No.: WO2004/020886

PCT Pub. Date: Mar. 11, 2004

(65) Prior Publication Data

US 2006/0096642 A1    May 11, 2006

(30) Foreign Application Priority Data

Aug. 30, 2002    (JP) .............................. 2002-256208

(51) Int. Cl.
| F16K 11/22 | (2006.01) |
| F16K 47/02 | (2006.01) |
| F16K 31/38 | (2006.01) |
| F16K 31/145 | (2006.01) |
| F16K 31/528 | (2006.01) |

(52) U.S. Cl. .................... 137/597; 251/38; 251/230
(58) Field of Classification Search ............... 137/597; 251/30.04, 38, 230, 253, 263
See application file for complete search history.

(56) References Cited

U.S. PATENT DOCUMENTS

| 4,262,879 A | * | 4/1981 | Gonner ........................ 251/230 |
| 5,109,550 A | | 5/1992 | Makita et al. |
| 5,204,999 A | | 4/1993 | Makita et al. |
| 5,217,043 A | * | 6/1993 | Novakovic .................. 137/460 |
| 5,502,845 A | | 4/1996 | Hayashi et al. |
| 5,758,863 A | * | 6/1998 | Buffet et al. .................. 251/28 |
| 5,819,326 A | | 10/1998 | Kobayashi et al. |

(Continued)

FOREIGN PATENT DOCUMENTS

JP        61-79077 U        5/1986

(Continued)

Primary Examiner—Stephen M. Hepperle
(74) Attorney, Agent, or Firm—Brooks Kushman P.C.

(57) ABSTRACT

A switching valve assembly 32 for use in a mixing faucet is disclosed. The switching valve assembly comprises a switching valve assembly 32 for use in a mixing faucet, which comprises a manual operation member 36 adapted to be moved in response to a pressing operation by a user, a push rod 35 having a base end joined to the manual operation member, a pilot valve 40 disposed relative to a distal end of the push rod, a coil spring 42 interposed between the pilot valve and the distal end of the push rod, a diaphragm main valve 46 having a pilot-valve port designed such that the pilot valve is selectively brought into contact therewith and separated therefrom, a pressure chamber 48 formed on the side of a back surface of the main valve to contain a part of the push rod, the pilot valve and the coil spring, and a valve seat 52 designed such that a front surface of the main valve is selectively seated thereon and unseated therefrom.

18 Claims, 16 Drawing Sheets

U.S. PATENT DOCUMENTS

| | | |
|---|---|---|
| 5,918,325 A | 7/1999 | Arita et al. |
| 5,983,413 A | 11/1999 | Hayashi et al. |
| 6,115,853 A | 9/2000 | Shibata et al. |
| 6,145,138 A | 11/2000 | Nakamura et al. |
| 6,795,982 B2 | 9/2004 | Noboru et al. |
| 2003/0213055 A1 | 11/2003 | Yoneda et al. |

FOREIGN PATENT DOCUMENTS

| | | |
|---|---|---|
| JP | 62-172879 U | 11/1987 |
| JP | 1-98982 U | 7/1989 |
| JP | 04-064783 A | 2/1992 |
| JP | 09-060969 A | 3/1997 |
| JP | 11-282542 A | 10/1999 |
| JP | 11-304245 A | 11/1999 |
| JP | 2001-098596 A | 4/2001 |
| JP | 2002-071050 A | 3/2002 |
| WO | WO 95/33101 | 12/1995 |
| WO | WO 98/05829 | 2/1998 |
| WO | WO 98/16696 | 4/1998 |
| WO | WO 98/30761 | 7/1998 |

* cited by examiner (a) EMBODIMENT OF PRESENT INVENTION (b) CONVENTIONAL EXAMPLE (a)

(b)

(c)

PRIOR ART

OPENING AND CLOSING VALVE

TECHNICAL FIELD

The present invention relates to a switching valve assembly, and more particularly to a switching valve assembly for use in a mixing faucet operable to mix hot water and cold water at a desired temperature and selectively stop and discharge the mixed water.

BACKGROUND ART

Heretofore, a pilot-controlled switching valve assembly has been known which comprises a main valve and a pilot valve for opening and closing the main valve, and various types of pilot-controlled switching valve assemblies have been proposed.

Fundamentally, all types of pilot-controlled switching valve are provided with (1) a manual operation member, such as a button, (2) a pilot valve movable in conjunction with the manual operation member, (3) a main valve and a pressure chamber disposed on the side of a back surface of the main valve, and designed to open the main valve in response to releasing a primary pressure in the pressure chamber by use of the pilot valve.

A specific structure of the conventional pilot-controlled switching valve assembly will be described below.

FIG. 19 is a schematic diagram showing one example of the conventional pilot-controlled switching valve assembly, which is disclosed in Japanese Patent Laid Open Publication No. 09-060969 (Patent Publication 1).

As shown in FIG. 19, this type of pilot-controlled switching valve assembly comprises a manual operation member 100 to be pressed by a push button or the like, a push rod 102 having a base end connected integrally or directly to the manual operation member, a pilot valve 104 provided at a distal end of the push rod 102, a diaphragm main valve 108 having a pilot-valve port 106 designed such that the pilot valve 104 is selectively brought into contact therewith and separated therefrom, a housing 112 defining a pressure chamber 110 formed on the side of the back surface of the main valve 110, and a valve seat 114 designed such that a front surface of the main valve 110 is selectively seated thereon and unseated therefrom. The pilot-controlled switching valve assembly also includes a sealing member 116 disposed at a portion of the housing 112 allowing the push rod 102 to penetrate therethrough, and a small hole 118 formed in a peripheral portion of the main valve 108.

FIG. 20 is a schematic diagram showing another example of the conventional pilot-controlled switching valve assembly, which is disclosed in Japanese Patent Laid Open Publication Nos. 11-304245 (Patent Publication 2) and 2001-098596 (Patent Publication 3).

As shown in FIG. 20, this type of pilot-controlled switching valve assembly has the same fundamental structure as that of the type illustrated in FIG. 19, and additionally includes a buffer mechanism (coil spring) 120 interposed between the manual operation member 100 and the base end of the push rod 102.

Patent Publication 1: Japanese Patent Laid Open Publication No. 09-060969

Patent Publication 2: Japanese Patent Laid Open Publication No. 11-304245

Patent Publication 3: Japanese Patent Laid Open Publication No. 2001-098596

The aforementioned conventional pilot-controlled switching valve assembly illustrated in FIG. 19 is designed such that the pilot valve 104 disposed within the pressure chamber 110 is brought in contact with and separated from the pilot-valve port 106 of the main valve 108, so that the pilot valve 104 is opened and closed to switch between water-stop and water-discharge states.

Thus, in an operation for switching from the water-discharge state to the water-stop state, it is firstly required that the pilot valve 104 be pressed through the push rod 102 in a direction allowing the pilot valve 104 to be brought into contact with the pilot-valve port 106. During this process, while the push rod 102 and the pilot valve 104 receive an upward force from a water pressure in the pressure chamber 110 and thereby the manual operation member 100 has to be pressed against the upward force, this required force is a very small value.

Then, when the pilot valve 104 is brought into contact with the pilot-valve port 106 of the main valve 108, a water pressure is acting on the main valve 108 in a direction allowing the main valve 108 to be moved away from the valve seat 114, and thereby the water-stopping operation has to be performed by use of a sufficient force against this water pressure. During this process, while the main valve 108 is moved toward the valve seat 114, this movement is performed at a low speed, which means that the pilot valve 104 forcibly presses the main valve 108 toward the valve seat 114. This forcible pressing of the main valve 108 toward the valve seat 114 causes the occurrence of water hammer when the main valve 108 is brought into contact with the valve seat 114, which leads to deterioration in operational feeling.

During the water-stopping operation, the conventional valve assembly illustrated in FIG. 19 has the difference (unevenness) in operational force between (1) before the pilot valve 104 is brought into contact with the pilot-valve port 106 and (2) after the pilot valve 104 is brought into contact with the pilot-valve port 106, resulting in undesirable operational feeling.

The pilot-controlled switching valve assembly illustrated in FIG. 20 is provided with the buffer mechanism 120 interposed between the manual operation member 100 and the base end of the pilot valve 104 to absorb a moving distance (displacement) of the pilot valve 104 in its stroke direction so as to provide improved operational feeling.

However, in this type of pilot-controlled switching valve assembly, a spring load onto the buffer mechanism 118 cannot be set at a low value, and thereby a spring constant of the buffer mechanism 118 cannot be set at a small value. Thus, the addition of the buffer mechanism 118 cannot contribute to improvement in operational feeling.

Specifically, when the pilot valve 104 disposed within the pressure chamber 110 is externally operated, the bottom surface of the pilot valve 104 is subjected to a water pressure for an area equivalent to the cross-sectional area of the push rod 102, and this water pressure acts on the push rod 102 (pilot valve 104) to move it away from the pilot-valve port 106. Therefore, a spring load on the buffer mechanism 120 has to be set at a value equal to or greater than the water pressure (if this is not done, the pilot valve 104 cannot be brought into contact with the pilot-valve port 106).

Consequently, it is difficult to downsize the buffer mechanism 120 in the conventional valve assembly illustrated in FIG. 20. Moreover, during the water-stopping operation, this type of conventional valve assembly still has the difference (unevenness) in operational force between (1) before the pilot valve 104 is brought into contact with the pilot-valve port 106 and (2) after the pilot valve 104 is brought into contact with the pilot-valve port 106, resulting in an undesirable operational feeling.

When a mixing faucet using a push button is developed, it is required to employ a pilot-controlled switching valve assembly as described above, but the conventional pilot-controlled switching valve assemblies involve the above problems. Thus, there is a need to be solve these problems.

DISCLOSURE OF INVENTION

In view of the aforementioned problems in the prior art, it is therefore an object of the present invention to provide a switching valve assembly capable of eliminating the unevenness in operational force to obtain a desirable operational feeling.

It is another object of the present invention to provide a switching valve assembly capable of facilitating downsizing.

In order to achieve the above objects, the present invention provides a switching valve assembly for use in a mixing faucet operable to mix hot water and cold water at a desired temperature and selectively stop and discharge the mixed water. The switching valve assembly comprises a manual operation member adapted to be moved in response to a pressing operation by a user, a push rod member having a base end joined to the manual operation member, a pilot valve disposed relative to a distal end of the push rod member, a buffer device interposed between the pilot valve and the distal end of the push rod member, a diaphragm main valve having a pilot-valve port designed such that the pilot valve is selectively brought into contact therewith and separated therefrom, a pressure chamber formed on the side of a back surface of the main valve to contain a part of the push rod member, the pilot valve and the buffer device, and a valve seat designed such that a front surface of the main valve is selectively seated thereon and unseated therefrom.

According to the above switching valve assembly of the present invention, when a water-discharge state is switched to a water-stop state, the push rod member is firstly pressed to bring the pilot valve into contact with the pilot-valve port. During this process, while the push rod member receives an upward force from a water pressure acting on the distal end thereof for an area equivalent to its cross-sectional area and thereby the manual operation member has to be pressed against the upward force, this required force (operational force) is small. Then, after the pilot valve is brought into contact with the pilot-valve port of the main valve, the main valve is moved toward the valve seat and seated on the valve seat so that the water-discharge state is switched to the water-stop state. The buffer device disposed within the pressure chamber makes it possible for no force to act thereon before the pilot valve is brought into contact with the pilot-valve port, and only a small force (operational force) may be applied thereto even after the pilot valve is brought into contact with the pilot-valve port. Thus, according to the present invention, the difference (unevenness) in operational force which would otherwise occur between (1) before the pilot valve is brought into contact with the pilot-valve port and (2) after the pilot valve is brought into contact with the pilot-valve port, can be eliminated during a water-stopping operation, to obtain a desirable operational feeling. In addition, a spring load on the buffer device can be set at a low value, and thereby a spring constant thereof can be set at a small value to facilitate downsizing of the switching valve assembly.

In the present invention, it is preferable that the buffer device be a coil spring having a spring constant of 0.01 to 2 N/mm.

According to the preferred embodiment of the present invention, the difference (unevenness) in operational force can be effectively eliminated to obtain a desirable operational feeling.

More preferably, the buffer device is a coil spring having a spring constant of 0.01 to 0.75 N/mm.

According to the preferred embodiment of the present invention, the difference (unevenness) in operational force can be eliminated more effectively to obtain a more desirable operational feeling.

In the present invention, it is preferable that the buffer device be a coil spring having a spring constant of 0.01 to $P_1 d^2 \pi/(4\delta)$ N/mm, wherein $\delta$ is the amount of deflection (mm) of the coil spring, $P_1$ is a water pressure (MPa), and d is the diameter (mm) of a rod portion of the push rod member.

According to the preferred embodiment of the present invention, the difference (unevenness) in operational force can be eliminated more effectively to obtain a more desirable operational feeling.

In the present invention, it is preferable that the push rod member be formed to have a smaller diameter than that of the pilot-valve port.

According to the preferred embodiment of the present invention, the push rod member formed to have a smaller diameter than that of the pilot-valve port allows an operational force of the manual operation member to be reduced so as to assure a reliable water-stopping performance.

In the present invention, it is preferable that the push rod member be made of stainless steel.

According to the preferred embodiment of the present invention, even if the push rod member has a small diameter, it can have a sufficient corrosion resistance during use in water to obtain enhanced reliability.

Preferably, the switching valve assembly of the present invention further includes a pilot-valve switching/holding mechanism operable to selectively switch the pilot valve between a water-stop position and a water-discharge position in conjunction with the movement of the manual operation member and hold the pilot valve in either one of the water-stop position and the water-discharge position, and the pilot-valve switching/holding mechanism has a heart cam structure.

According to the preferred embodiment of the present invention, the pilot-valve switching/holding mechanism having a heart cam structure allows the push rod member to be moved in a reciprocating motion (up-and-down motion) so that a load on a sealing member is reduced to obtain enhanced reliability.

In the present invention, it is preferable that the mixing faucet comprises a faucet body, a faucet push button for discharging the mixed water directly from a faucet, and a shower push button for discharging the mixed water from a shower, and each of the faucet and shower push buttons has a biasing device adapted to press the push button downward when the push button is located in a water-discharge position and above a top surface of the faucet body.

According to the preferred embodiment of the present invention, when the user performs a water-discharging operation for switching from the water-stop state to the water-discharge state, each of the faucet and shower push buttons is pressed downward by the biasing device so as to prevent the push button itself from being abnormally moved (vibrated).

The present invention also provides a switching valve assembly comprising a manual operation member adapted to be moved in response to a pressing operation by a user, a push rod member having a base end joined to the manual operation member, a pilot valve disposed relative to a distal end of the push rod member, a buffer device interposed between the pilot valve and the distal end of the push rod member, a diaphragm main valve having a pilot-valve port designed such that the pilot valve is selectively brought into contact therewith and separated therefrom, a pressure chamber formed on the side of a back surface of the main valve to contain a part of the push rod member, the pilot valve and the buffer device, and a valve seat designed such that a front surface of the main valve is selectively seated thereon and unseated therefrom.

BEST MODE FOR CARRYING OUT THE INVENTION

With reference to accompanying drawings, an embodiment of the present invention will now be described.

Firstly, with reference to FIGS. 1 to 7(b), a pilot-controlled switching valve assembly according to a first embodiment of the present invention will be described. This assembly is applied to a mixing faucet.

Figure 1:
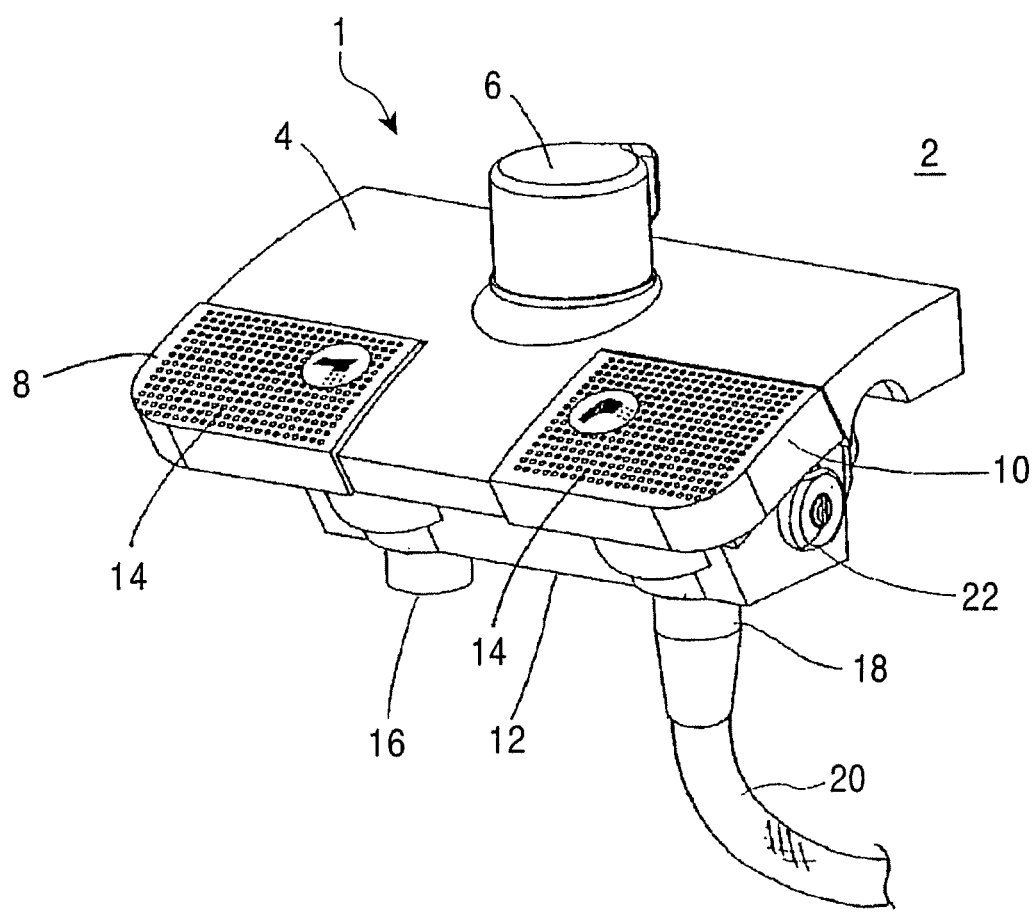
FIG. 1 is a general perspective view showing a mixing faucet to which a pilot-controlled switching valve assembly according to a first embodiment of the present invention is to be applied.

FIG. 1 is a general perspective view showing the mixing faucet to which the pilot-controlled switching valve assembly according to the first embodiment of the present invention is to be applied.

As shown in FIG. 1, the mixing faucet indicated by the reference numeral 1 is attached onto a wall surface 2, which is an installation surface of the mixing faucet 1, in such a manner as to protrude therefrom. The mixing faucet 1 comprises a plate-shaped heat-insulating cover 4 which is a part of a faucet body. The mixing faucet 1 further includes a temperature-adjusting dial 6, a faucet push button 8 for discharging mixed water from a faucet, and a shower push button 10 for discharging the mixed water from a shower, which are individually attached to the heat-insulating cover 4. The mixing faucet 1 has a bottom surface covered by another heat-insulating cover 12.

The mixing faucet 1 is operable, in response to setting a desired water temperature by use of the temperature-adjusting dial 6, to adjust a mixing ratio between hot water and cold water so as to allow the mixed water to be discharged at the desired temperature. In this case, the mixed water can be discharged from the faucet by operating the faucet push button 8, or discharged from the shower by operating the shower push button 10.

In this example, the shower push button 10 is formed to have a larger size than that of the faucet push button 8 to provide enhanced operationality for users.

Further, the faucet push button 8 and the shower push button 10 are disposed at a position closer to a user as compared to the temperature-adjusting dial 6 to provide enhanced operationality.

Each of the faucet push button 8 and the shower push button 10 also has an operational surface disposed to be approximately flush with a top surface of the plate-shaped heat-insulating cover 4 to provide enhanced operationality.

Furthermore, each operational surface of the faucet push button 8 and the shower push button 10 is provided with an anti-slip means 14, such as irregularities.

A faucet-water outlet 16 and a shower-water outlet 18 are disposed in the vicinity of a frontward portion of the bottom surface of the mixing faucet 1. A shower hose 20 in fluid communication with a showerhead (not shown) is connected to the shower-water outlet 18.

Figure 2:
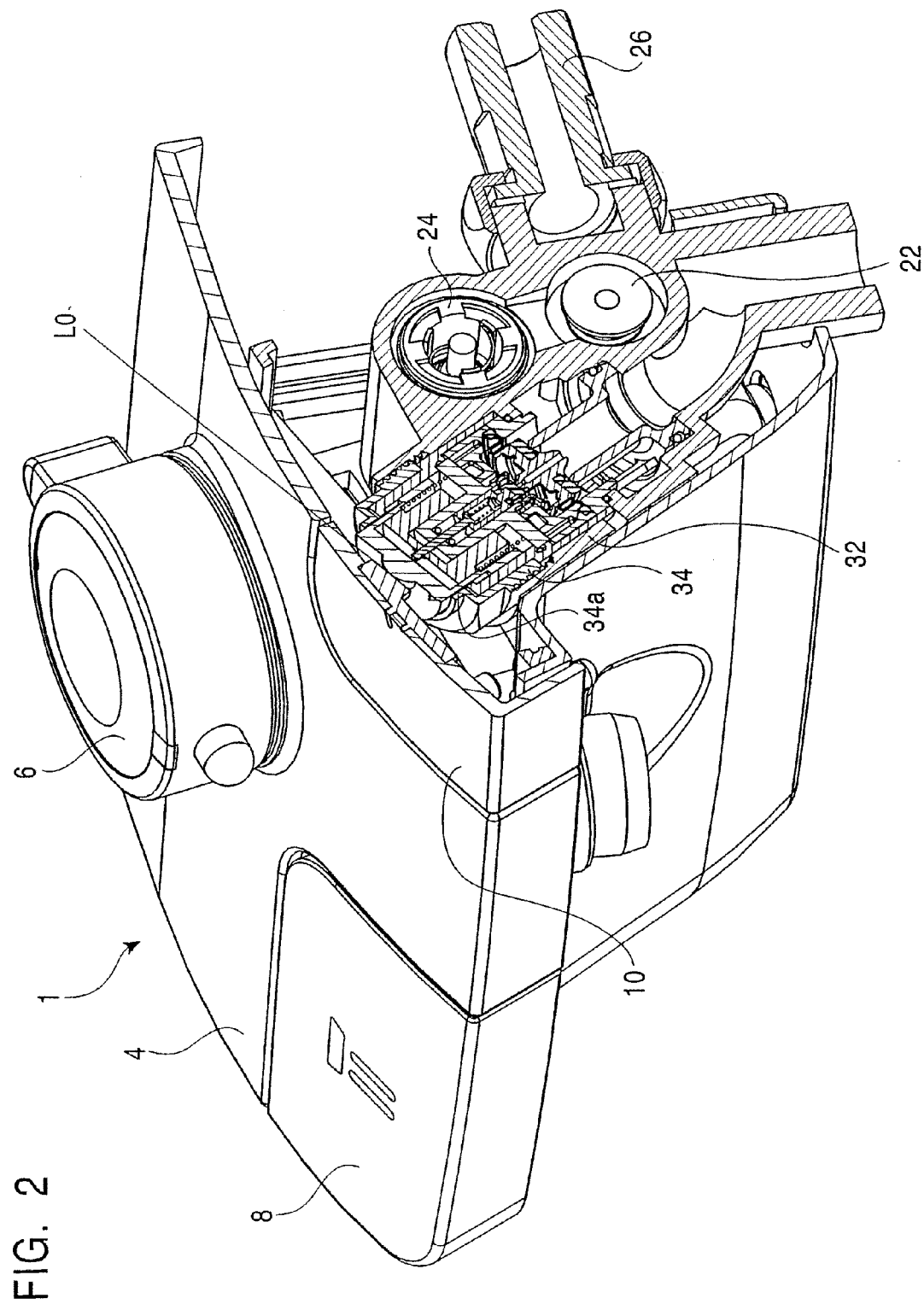
FIG. 2 is a perspective view showing the state after the pilot-controlled switching valve assembly according to the first embodiment of the present invention is attached to a mixing faucet.

The mixing faucet 1 has right and left side surfaces each provided with an adjusting device for a water shutoff valve 22 and a maintenance hole for a filter and a check valve 24, parts of the valve 22 and the hole being also shown in FIG. 2. The adjusting device and the maintenance hole in the right side surface are used for supplying cold water to the mixed faucet 1, and the adjusting device and the maintenance hole in the left side surface are used for supplying hot water to the mixed faucet 1.

One side surface of the mixing faucet 1 to be fixed to the wall surface is formed with a pair of connection portions designed such that a cold-water supply pipe 26 (see FIG. 2) and a hot-water supply pipe are connected thereto, respectively.

A user can set a desired temperature using the temperature-adjusting dial 6, and then push the faucet push button 8 when the user wants to obtain feed water from the faucet or push the shower push button 10 when the user wants to obtain feed water from the shower, so as to immediately obtain the feeding of the mixed water at the desired temperature. Then, the user can re-push the push buttons 8, 10 to stop the mixed water.

The flows of cold water and hot water in the mixing faucet 1 during the above operation will be described below. Each of the flow volumes of cold water and hot water supplied, respectively, from the cold-water supply pipe 26 and the hot-water supply pipe (not shown) into the mixing faucet 1 is reduced to an appropriate value by a corresponding one of the shutoff valves 22 for cold water and hot water. Then, each of the adjusted cold water and hot water passes through corresponding ones of the filters and check valves 24 for cold water and hot water, and flows into a temperature control valve, which is a thermostat-type hot/cold water mixing valve. The cold water and hot water are automatically adjusted through the temperature control valve to have the desired temperature, and the mixed water flows out of the temperature control valve. Then, the mixed water is discharged from one or both of the faucet and the shower through a corresponding one or both of after-mentioned two switching valve units (pilot-controlled switching valve assemblies) 30, 32, which are provided, respectively, for the faucet and the shower (FIG. 2 shows only the pilot-controlled switching valve assembly 32).

Figure 3:
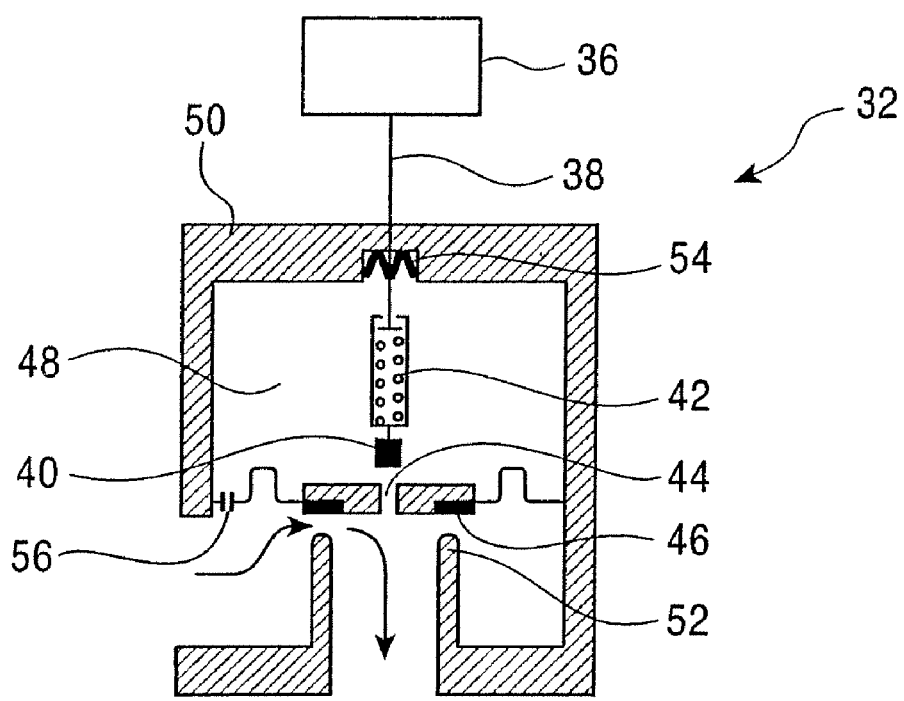
FIG. 3 is a schematic diagram showing a fundamental structure of the pilot-controlled switching valve assembly according to the first embodiment of the present invention.

With reference to FIGS. 2 and 3, a fundamental structure of the pilot-controlled switching valve assembly according to the first embodiment will be described below. FIG. 2 is a perspective view showing the state after the pilot-controlled switching valve assembly according to the first embodiment of the present invention is attached to a mixing faucet, and FIG. 3 is a schematic diagram showing the fundamental structure of the pilot-controlled switching valve assembly according to the first embodiment of the present invention.

As shown in FIG. 2, a pair of switching valve units 30, 32 each of which is the pilot-controlled switching valve assembly according to the first embodiment) (FIG. 2 shows only the pilot-controlled switching valve assembly 32) are disposed in contact, respectively, with bottom surfaces of the faucet and shower push buttons 8, 10 of the mixing faucet 1. Each of the switching value units 30, 32 is attached to the body of the mixing faucet 1 with a switching-valve-unit attaching nut 34. This switching-valve-unit attaching nut 34 has a top end formed with an extension 34a to prevent water from getting into each of the switching value unit 30, 32.

The faucet switching valve unit 30 and the shower switching valve unit 32 have the same structure, and thus the following description will be given only about the shower switching valve unit 32.

Before the detailed description about the structure of the switching valve unit 32 is given, the fundamental structure of the switching valve unit (pilot-controlled switching valve assembly) according to the first embodiment will be described with reference to FIG. 1.

As shown in FIG. 3, the switching valve unit 32 assembly comprises a manual operation member 34 adapted to be moved in response to a pressing operation in which a user presses the shower push button 10, a push rod 38 having a base end joined to the manual operation member 36, and a pilot valve 38 disposed relative to a distal end of the push rod 38, wherein a coil spring 42 serving as a buffer device is interposed between a pilot valve 40 and the distal end (lower end) of the push rod 38. The switching valve unit 32 further includes a diaphragm main valve 46 having a pilot-valve port (pressure release hole) 44 designed such that the pilot valve 40 is selectively brought into contact therewith and separated therefrom, a housing 50 defining a pressure chamber 48 which is formed on the side of a back surface of the main valve 46 to contain a part of the push rod 38, the pilot valve 40 and the coil spring 42, a valve seat 52 designed such that a front surface of the main valve 46 is selectively seated thereon and unseated therefrom, a sealing member 54 at a portion of the housing 50 allowing the push rod 39 to penetrate therethrough, and a small hole (primary-pressure inlet port) 56 formed in a peripheral portion of the main valve 46.

A fundamental operation for the switching valve unit 32 will be described below. This switching valve unit 32 is designed such that the pilot valve 40 disposed within the pressure chamber 48 is brought in contact with and separated from the pilot-valve port 44 of the main valve 46, so that the pilot valve 40 is opened and closed to switch between water-stop and water-discharge states.

Thus, in an operation for switching from the water-discharge state to the water-stop state, it is firstly required that the pilot valve 44 be pressed by the push rod 38 in a direction allowing the pilot valve 44 to be brought into contact with the pilot-valve port 44. During this process, while the push rod 38 receives an upward force from a water pressure acting on the distal end thereof for an area equivalent to its cross-sectional area, and a sliding frictional resistance from the sealing member 54, and thereby the manual operation member 36 has to be pressed against the force and resistance, this required force (operational force) is a small value.

Then, when the pilot valve 40 is brought into contact with the pilot-valve port 44 of the main valve 46, water having a primary pressure in a primary water passage flows into the pressure chamber 48 through the small hole 56, and the main valve 46 is moved toward the valve seat 52 at a low speed according to the inflow of the water. Through the above process, the main valve 46 is seated on the valve seat 52 so that the water-discharge state is switched to the water-stop state.

In the first embodiment, the coil spring 42 serving as a buffer device is disposed between the push rod 38 and the pilot valve 40, or within the pressure chamber 48. Thus, no force acts on the coil spring 42 before the pilot valve 40 is brought into contact with the pilot-valve port 44, and only a small force may be applied thereto even after the pilot valve 40 is brought into contact with the pilot-valve port 44, as described later in detail.

In an operation for switching from the water-stop state to the water-discharge state, when the manual operation member 36 is pressed, the pilot valve 40 is separated from the pilot-valve port (pressure release hole) 44 by means of an after-mentioned pilot-valve holding/switching mechanism 62 and biasing spring 68. Thus, the pressure chamber 48 is opened, and the main valve 46 is unseated from the valve seat 52, so that the water-stop state is switched to the water-discharge state (see FIG. 5).

As described above, in the switching valve unit 32 according to the first embodiment, the moving speed of the main valve 46 is intentionally reduced. This reduction is done to prevent a water hammer phenomenon from occurring when the main valve 46 is closed. Specifically, when the primary water flows into the pressure chamber 48 through the small hole 56 formed in the main valve 46, and the pressure chamber 110 is filled with the primary water, the main valve 46 is moved toward the valve seat 52. However, the small hole 56 is typically set to have a very small diameter to reduce an inflow speed of water flowing into the pressure chamber 48, whereby the moving speed (closing speed) of the main valve 46 is reduced to prevent a water hammer phenomenon from occurring when the main valve 46 is closed.

Figure 4:
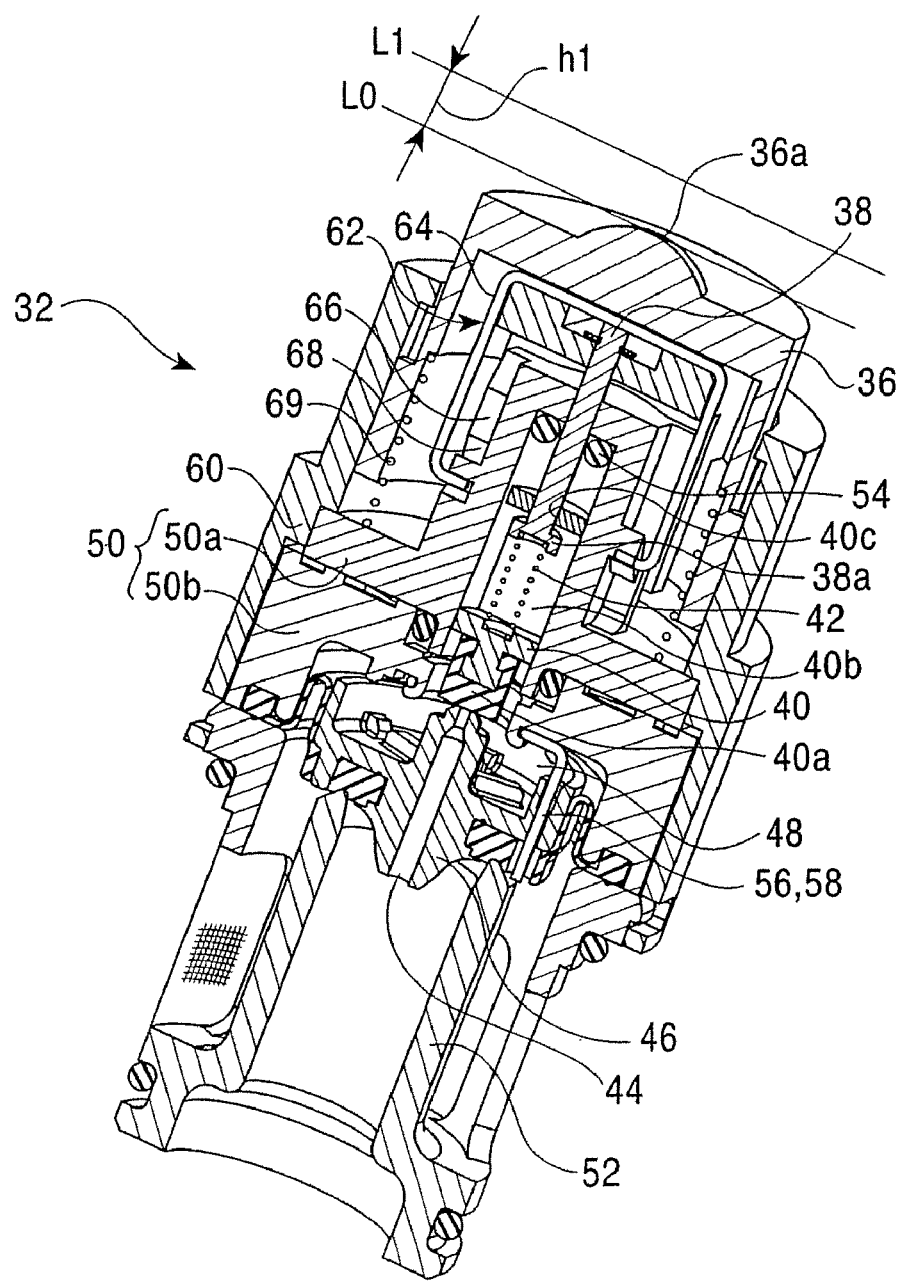
FIG. 4 is a sectional view showing a switching valve unit (pilot-controlled switching valve assembly) according to the first embodiment of the present invention, wherein the switching valve unit is in a water-stop state (closed state).
Figure 5:
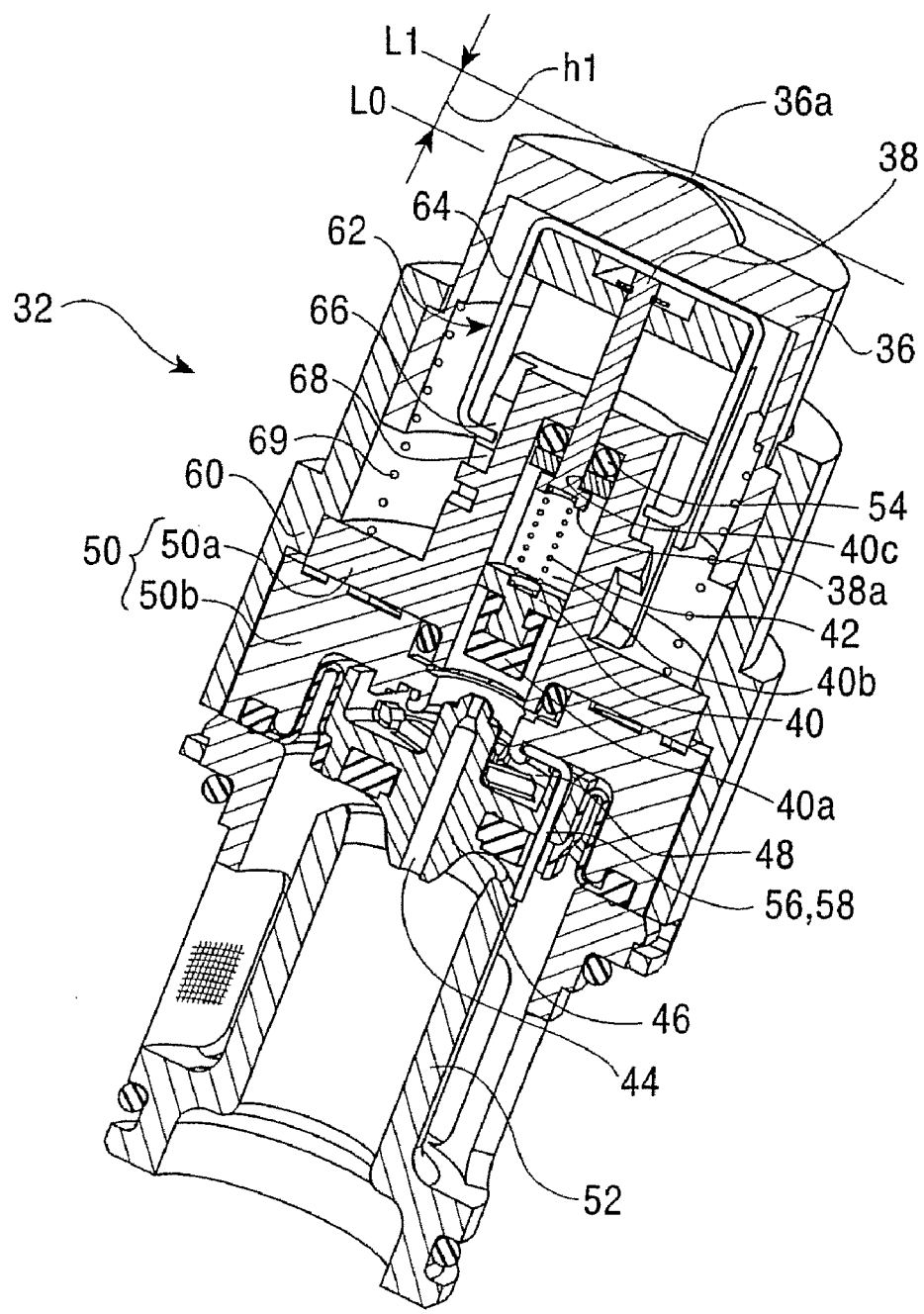
FIG. 5 is a sectional view showing the switching valve unit (pilot-controlled switching valve assembly) according to the first embodiment of the present invention, wherein the switching valve unit is in a water-discharge state (open state).
Figure 6:
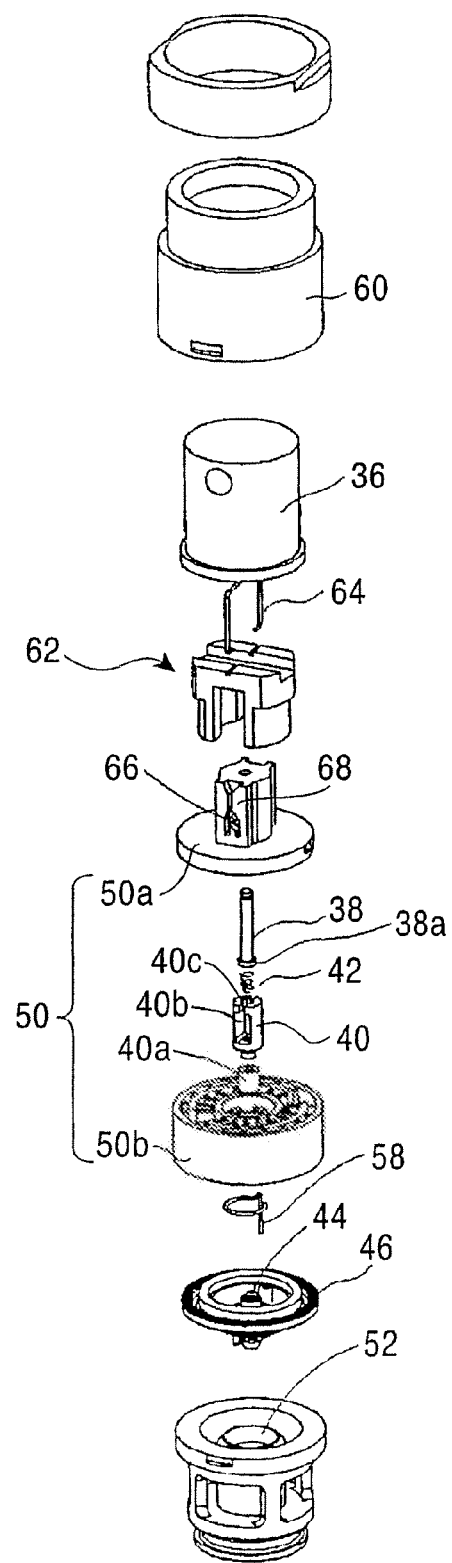
FIG. 6 is an exploded diagram showing components of the switching valve unit (pilot-controlled switching valve assembly) according to the first embodiment of the present invention.

With reference to FIGS. 4 to 6, the structure of the switching valve unit (pilot-controlled switching valve assembly) 32 will be described in more detail.

FIG. 4 is a sectional view showing the switching valve unit (pilot-controlled switching valve assembly) according to the first embodiment, wherein the switching valve unit is in a water-stop state (closed state). FIG. 5 is a sectional view showing the switching valve unit (pilot-controlled switching valve assembly) according to the first embodiment, wherein the switching valve unit is in a water-discharge state (open state). FIG. 6 is an exploded diagram showing components of the switching valve unit (pilot-controlled switching valve assembly) according to the first embodiment.

As shown in FIG. 4, the switching valve unit 32 comprises the manual operation member 36, the push rod 38, the pilot valve 40, the coil spring 42 serving as a buffer device, and the diaphragm main valve 46 having the pilot-valve port (pressure release hole) 44, the housing 50 (50*a*, 50*b*) defining the pressure chamber 48, the valve seat 52, the sealing member 54 and the small hole 56, which have already been described in conjunction with FIG. 3.

Further, a cleaning pin 58 is inserted into the above small hole (primary-pressure inlet port) 56 to narrow the cross-sectional area of the primary-pressure inlet port of the small hole 56. This allows the inflow speed of the primary pressure into the pressure chamber to be reduced so as to provide a lowered closing speed of the main valve 46 to prevent a water hammer phenomenon from occurring when the main valve 46 is closed, as described above.

The housing 50 defining the pressure chamber 48 comprises a first housing 50*a* surrounding a space in which the pilot valve 40 is primarily disposed, and a second housing 50*b* surrounding a space on the side of the back surface of the main valve 46.

The switching valve unit 32 also includes an assembling nut 60 disposed around the outermost periphery thereof to assemble four components, namely the manual operation member 36, the first housing 50*a*, the second housing 50*b* and the valve seat 52, so as to make up the switching valve unit 32.

The switching valve unit 32 further includes a pilot-valve switching/holding mechanism 62. This pilot-valve switching/holding mechanism 62 is designed to be moved in conjunction with the aforementioned faucet push button 8 and the shower push button 10, and have functions for repeatedly switching the pilot valve 40 between a water-stop position corresponding to the water-stop state and a water-discharge position corresponding to the water-discharge state, every time either one or both of the push buttons 8, 10 is pressed or every time the manual operation member 36 is pressed, and holding the pilot valve 40 in either one of the water-stop position and the water-discharge position.

While this pilot-valve switching/holding mechanism 62 may be a mechanism to be commonly used for a knock mechanism for knock-type ballpoint pens, the first embodiment employs a heart cam mechanism comprising a pin 64 adapted to be moved in conjunction with the manual operation member 36, an inverted heart-shaped cam groove 66 formed in the outer peripheral surface of the first housing 50*a* to allow the lower portion of the pin 64 to be moved therealong while being elastically deformed, and a holding protrusion 68 adapted to hold the pin 64 in the water-stop state (closed state), as shown in FIG. 4.

The pilot-valve switching/holding mechanism 62 consisting of the heart cam mechanism allows only a reciprocating motion (up-and-down motion) of the push rod 38 to act on the sealing member 54 sealing the pressure chamber 48 without a rotational motion of the push rod 38 as in the above knock mechanism. Thus, the load on the sealing member 54 is reduced to obtain enhanced reliability.

The reference numeral 69 indicates a biasing spring. When one of the push buttons 8, 10 is pressed in the operation for switching from the water-stop state to the water-discharge state, and the manual operation member 36 is released from the holding in the water-stop position by the pilot-valve switching/holding mechanism 62 so as to allow the pilot valve 40 to be separated from the valve seat 52, the biasing spring 69 biases or urges the manual operation member 36 to move upward so as to facilitate the switching to the water-discharge state.

The structure of an interconnection portion between the push rod 38 and the pilot valve 40 will be described below. As shown in FIGS. 4 and 5, the coil spring 42 serving as a buffer device for absorbing the moving distance (displacement) of the push rod 38 in its stroke direction is disposed at the distal end (lower end) of the push rod 38 and within the pressure chamber 48, as described above. The distal end (lower end) of the push rod 38 is formed as a large diameter portion 38*a*, and the top end of the pilot valve 40 has a packing 40*a* attached thereto. The pilot valve 40 has a hollow portion 40*b*, and the coil spring 42 is contained in the hollow portion 40*b*. The pilot valve 40 has a top wall formed with an insertion hole 40*c* allowing the push rod 38 to be slidably inserted thereinto. The pilot valve 40 is made of an elastically deformable resin material. Thus, during assembling, the push rod 38 is inserted into the insertion hole 40*c* while deforming the pilot valve 40 so as to allow the large diameter portion 38a to be contained in the hollow portion 40b. In this state, the coil spring 42 acts on the push rod 38 and the pilot valve 40 in a direction allowing them to move away from one another.

Thus, in the water-discharging operation for switching from the water-stop state to the water-discharge state, the large diameter portion 38a at the distal end of the push rod 38 is brought into engagement with the top wall of the pilot valve 40 by the biasing force of the coil spring 42, and thereby the pilot valve 40 is moved in conjunction with the movement of the push rod 38 and unseated from the pilot-valve port 44 formed in the main valve 46 (see FIG. 5).

In the water-stopping operation for switching from the water-discharge state to the water-stop state, when the pilot valve 40 is brought into contact with the pilot-valve port 44 formed in the main valve 46, the large diameter portion 38a of the push rod 38 is separated from the top wall of the pilot valve 40 and moved downward. During this process, the moving distance (displacement) of the push rod 30 in its stroke direction is absorbed by the coil spring 42 (see FIG. 4).

Thus, during the water-stopping operation, the difference (unevenness) in operational force which would otherwise occur between (1) before the pilot valve 40 is brought into contact with the pilot-valve port 44 and (2) after the pilot valve 40 is brought into contact with the pilot-valve port 44, can be eliminated to obtain a desirable operational feeling, as described above.

In the switching valve unit 32 according to the first embodiment, when the operational force of the manual operation member 36 is to be reduced, it is desirable to minimize the diameter of the push rod 38, because the push rod 38 receives an upward force from a water pressure in the pressure chamber 48 (water pressure to the distal end of the push rod 38 for an area equivalent to its cross-sectional area). For example, the push rod 38 may be formed to have a smaller diameter than that of the pilot-valve port 44 of the main valve 46. This makes it possible to reduce the operational force (pressing force) even under a high-pressure condition, and assure a reliable water-stopping performance.

In addition, when the pilot valve 40 is in the water-stop position, or seated on the pilot-valve port 44, the primary pressure acts on the pilot valve 40 in a direction allowing the pilot valve 40 to be seated on the pilot-valve port 44 so that the water-stopping performance is further assured.

In the first embodiment, the push rod 38 is made of stainless steel. Thus, even if the push rod 38 is designed to have a small diameter, it can have a sufficient corrosion resistance during use in water to obtain enhanced reliability.

Figure 20:
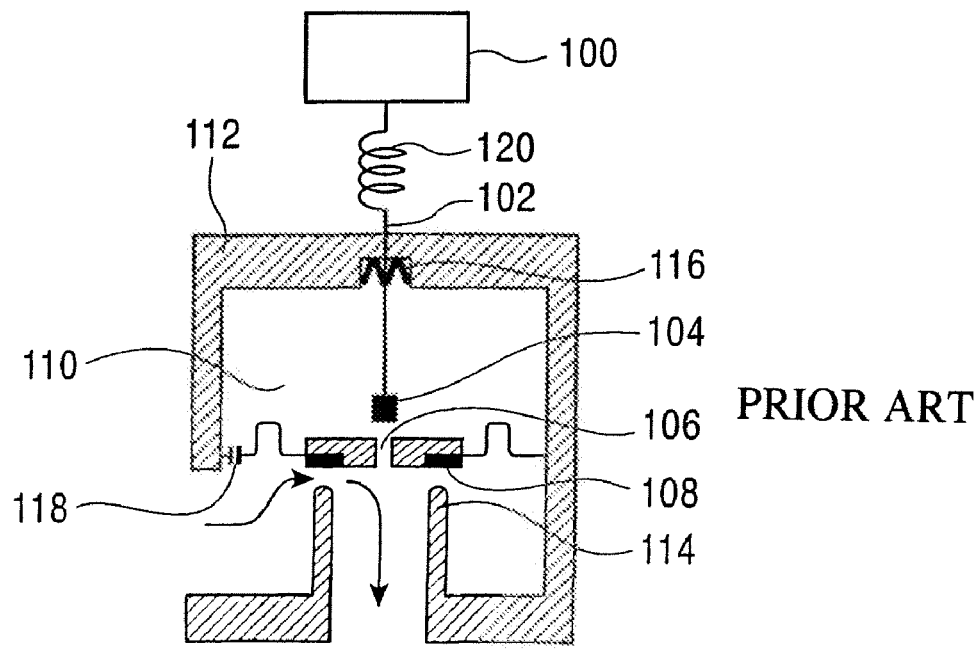
FIG. 20 is a schematic diagram showing another example of conventional pilot-controlled switching valve assemblies.

As compared to the conventional example in FIG. 20, the pilot-controlled switching valve assembly (switching valve unit) according to the first embodiment can reduce a load acting on the coil spring serving as a buffer device (spring load), and thereby the coil spring can be set to have a lower spring constant. This makes it possible to obtain enhanced operationality and facilitate downsizing, the reason for which will be explained with reference to FIGS. 7(*a*) to 8(*b*).

The following comparison between the first embodiment and the conventional example will be made under the common conditions that both of them have the push rod 38 having a diameter of 2 mm, a water pressure is 0.75 MPa (maximum vale of a tap water pressure), and a force against the sliding frictional resistance of the sealing member 54 is 0.6 N.

Figure 7:
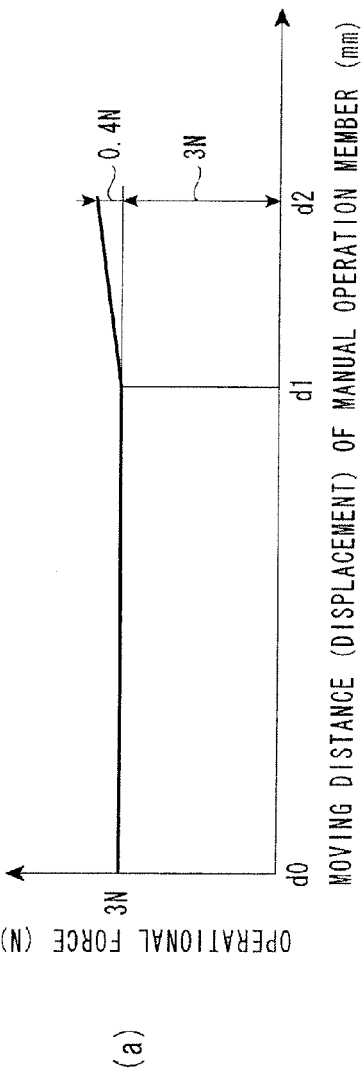
FIG. 7(a) is a graph showing the relationship between a moving distance (displacement) of a manual operation member and an operational force F during a water-stopping operation in the pilot-controlled switching valve assembly according to the first embodiment of the present invention.
FIG. 7(b) is a graph showing the relationship between a moving distance (displacement) of a manual operation member and an operational force F during a water-stopping operation in a conventional pilot-controlled switching valve assembly as shown in FIG. 20.
Figure 7:
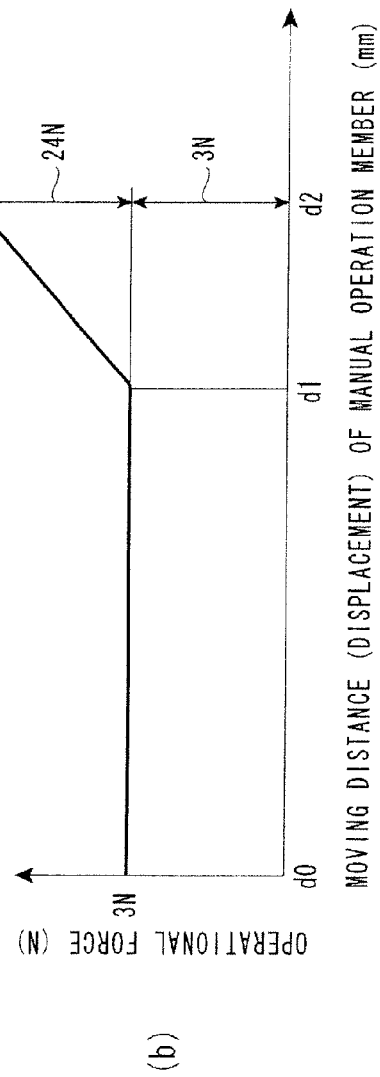
Figure 8:
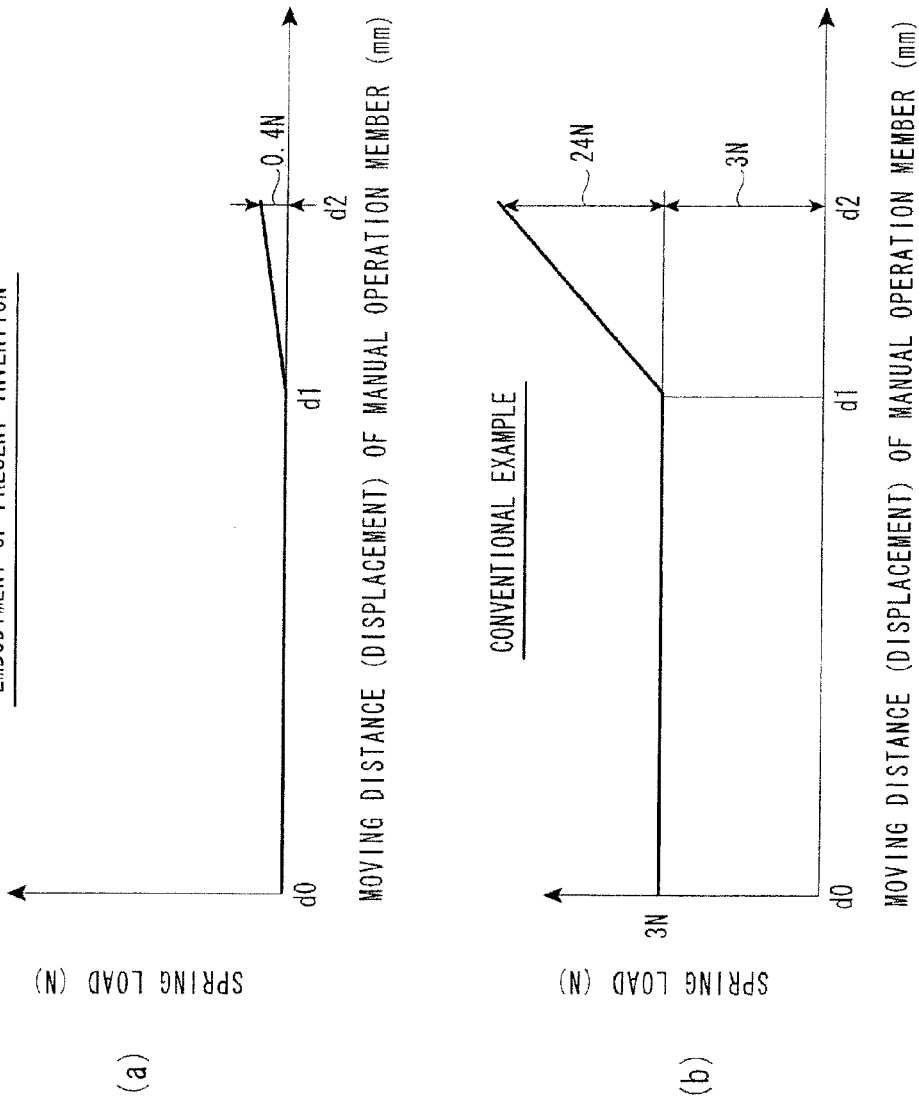
FIG. 8(a) is a graph showing the relationship between a moving distance (displacement) of a manual operation member and a spring load (N) acting on a coil spring during the water-stopping operation in the pilot-controlled switching valve assembly according to the first embodiment of the present invention.
FIG. 8(b) is a graph showing the relationship between a moving distance (displacement) of a manual operation member and a spring load (N) acting on a coil spring during the water-stopping operation in the conventional pilot-controlled switching valve assembly as shown in FIG. 20.

FIG. 7(*a*) is a graph showing the relationship between a moving distance (displacement) (mm) of the manual operation member 36 and an operational force F (N) during the water-stopping operation (during switching from the water-discharge state to the water-stop state) in the pilot-controlled switching valve assembly according to the first embodiment. FIG. 7(*b*) is a graph showing the relationship between a moving distance (displacement) (mm) of the manual operation member and an operational force F (N) during the water-stopping operation in the conventional example in FIG. 20. FIG. 8(*a*) is a graph showing the relationship between a moving distance (displacement) (mm) of the manual operation member 36 and a spring load (N) acting on the coil spring during the water-stopping operation in the pilot-controlled switching valve assembly according to the first embodiment. FIG. 8(*b*) is a graph showing the relationship between a moving distance (displacement) (mm) of the manual operation member and a spring load (N) acting on the coil spring during the water-stopping operation in the conventional example in FIG. 20. In these figures, d0 indicates a position where the water-stopping operation is initiated, d1 indicates a position where the pilot valve 40 is brought into contact with the pilot-valve port 44, and d2 indicates the lowermost position to which the manual operation member 36 can be moved (displaced) by the pilot-valve switching/holding mechanism 62.

In the first embodiment, the coil spring 42 is incorporated in the hollow portion 40b of the pilot valve 40 while a very small load (e.g. 0.1 N) is applied thereto during assembling.

Between the position d0 and the position d1, or before the pilot valve 40 is brought into contact with the pilot-valve port 44, an operational force of 3N (=2.4 N+0.6 N), which is balanced with a resultant of a force received from the above water pressure: 2.4 N (=cross-sectional area of the push rod×the water pressure=3.14 mm$^2$×0.75 MPa) and a force against the sliding frictional resistance of the sealing member 54: 0.6 N, acts on the push rod 38. Thus, as shown in FIG. 7(*a*), the operational force is kept at 3 N before the pilot valve 40 is brought into contact with the pilot-valve port 44.

Further, as shown in FIG. 8(*a*), before the pilot valve 40 is brought into contact with the pilot-valve port 44 (between the position d0 and the position d1), no load acts on the coil spring 42, or the spring load is zero.

Then, after the pilot valve 40 is brought into contact with the pilot-valve port 44, it is required to deflect the coil spring 42 by an operational force. A spring load acting on the coil spring to deflect it may be an extremely small value (approximately zero) because substantially no load acts on the coil spring 42 before the pilot valve 40 is brought into contact with the pilot-valve port 44. Thus, in the first embodiment, the spring constant is set at a small value providing a spring load of about 0.4 N at the lowermost position d2 to which the manual operation member 36 can be moved.

More specifically, after the pilot valve 40 is brought into contact with the pilot-valve port 44, or when the moving distance of the manual operation member is changed from d1 to d2, the amount of deflection (δ) of the coil spring 42 is 4 mm. In this case, given that the spring load during assembly is zero, the spring constant of the coil spring 42 is 0.1 N/mm (=0.4 N/4 mm). Given that the spring load during assembly is 0.1 N, the spring constant of the coil spring 42 is 0.075 N/mm (=(0.4−0.1)N/4 mm).

In the conventional example, the coil spring is disposed outside the pressure chamber. Thus, an operational force of 3N(=2.4 N+0.6 N), which is balanced with a resultant of a force received from the above water pressure: 2.4 N(=cross-sectional area of the push rod×the water pressure=3.14 mm²×0.75 MPa) and a force against the sliding frictional resistance of the sealing member 54: 0.6 N, initially acts on the coil spring as a spring load. Consequently, the conventional example is required to use a coil spring having a large spring constant capable of generating only an extremely small amount of deflection even if 3.0 N of spring load acts thereon. This value is extremely large as compared to the spring load acting on the coil spring in the first embodiment, which is approximately zero.

In the conventional example, as shown in FIG. 7(b), between the position d0 and the position d1, or before the pilot valve 40 is brought into contact with the pilot-valve port 44, the operational force of 3N(=2.4 N+0.6 N), which is balanced with the resultant of the force received from the above water pressure: 2.4 N(=cross-sectional area of the push rod×the water pressure=3.14 mm×0.75 MPa) and the force against the sliding frictional resistance of the sealing member 54: 0.6 N, acts on the push rod 38, as in the first embodiment.

However, in the conventional example, as shown in FIG. 8(b), before the pilot valve 40 is brought into contact with the pilot-valve port 44 (between the position d0 and the position d1), a spring load equivalent to 3N of operational force already acts on the coil spring.

Then, after the pilot valve 40 is brought into contact with the pilot-valve port 44, it is required to deflect the coil spring by an operational force. However, as described above, this coil spring is essentially designed to have a large spring, and thereby a large operational force is required to deflect the coil spring. For example, given that a coil spring having a spring constant of 6 N/mm generating a displacement of 0.5 mm relative to a spring load of 3N is used, and the amount of deflection (δ) of the coil spring for absorbing the moving distance (displacement) of the manual operation member is 4 mm, 24 N of operational force is required.

A preferable range of the spring constant of the coil spring serving as a buffer device in the pilot-controlled switching valve assembly (switching valve unit) in the first embodiment will be described below.

While the spring constant of the coil spring in the above conventional example has to be set at a large value of 6 N/mm or more due to the buffer device (coil spring) disposed outside the pressure chamber, it is preferable that the spring constant of the coil spring in the first embodiment be set in the range of 0.01 to 2 N/mm. The coil spring having a spring constant set in the above range makes it possible to eliminate the difference (unevenness) in operational force during the water-stopping operation, which would otherwise occur between (1) before the pilot valve 40 is brought into contact with the pilot-valve port 44 and (2) after the pilot valve 40 is brought into contact with the pilot-valve port 44, so as to obtain a desirable operational feeling, as compared to the conventional example.

Further, given that an operational force (3N) before the pilot valve 40 is brought into contact with the pilot-valve port 44 (between d0 to d1) is an initial-stage operational force, if an operational force (spring load) to be added after the pilot valve 40 is brought into contact with the pilot-valve port 44 is equal to or less than the initial-stage operational force (3N), the difference (unevenness) in operational force during the water-stopping operation, which would otherwise occur between (1) before the pilot valve 40 is brought into contact with the pilot-valve port 44 and (2) after the pilot valve 40 is brought into contact with the pilot-valve port 44, can be effectively eliminated to obtain a desirable operational feeling as compared to the conventional example.

In this case, the coil spring may be set to have a spring constant of 0.01 to $P_1 d^2 \pi/(4\delta)$ N/mm, wherein δ is the amount of deflection (mm) of the coil spring, $P_1$ is a water pressure (MPa), and d is the diameter (mm) of a rod portion of the push rod member.

More specifically, given that the diameter of the push rod is 2 mm, the water pressure is 0.75 MPa (maximum value of a tap water pressure) and the amount of deflection of the coil spring 42 is 4 mm, the spring constant of the coil spring is in the range of 0.01 to 0.75 N/mm(=3 N/4 mm).

Thus, in the first embodiment, the spring constant of the coil spring may be set in the range of 0.01 to 0.75 N/mm. This makes it possible to eliminate the difference (unevenness) in operational force during the water-stopping operation, which would otherwise occur between (1) before the pilot valve 40 is brought into contact with the pilot-valve port 44 and (2) after the pilot valve 40 is brought into contact with the pilot-valve port 44, so as to obtain an improved desirable operational feeling.

The minimum value of the spring constant of the coil spring in the first embodiment is set at 0.01 N/mm based on three required conditions for reducing the spring constant of the coil spring: reducing the diameter of a spring wire rod of the coil spring; reducing the number of turns of the coil spring; and increasing the diameter of the coil spring.

As is clear from the comparison between the first embodiment and the conventional example, the pilot-controlled switching valve assembly according to the first embodiment allows the spring constant of the coil spring 42 to be set at a smaller value than that in the conventional valve assembly having the coil spring disposed outside the pressure chamber.

Therefore, as seen in FIGS. 7(a) and (b), the difference (unevenness) in operational force during the water-stopping operation, which would otherwise occur between (1) before the pilot valve 40 is brought into contact with the pilot-valve port 44 and (2) after the pilot valve 40 is brought into contact with the pilot-valve port 44, can be eliminated so as to obtain an improved desirable operational feeling.

In addition, as seen in FIGS. 8(a) and 8(b), the pilot-controlled switching valve assembly according to the first embodiment makes it possible to reduce a spring load acting on the coil spring to obtain a desirable operational feeling and facilitate downsizing of the assembly to a large degree as compared to the conventional valve assembly.

Figure 19:
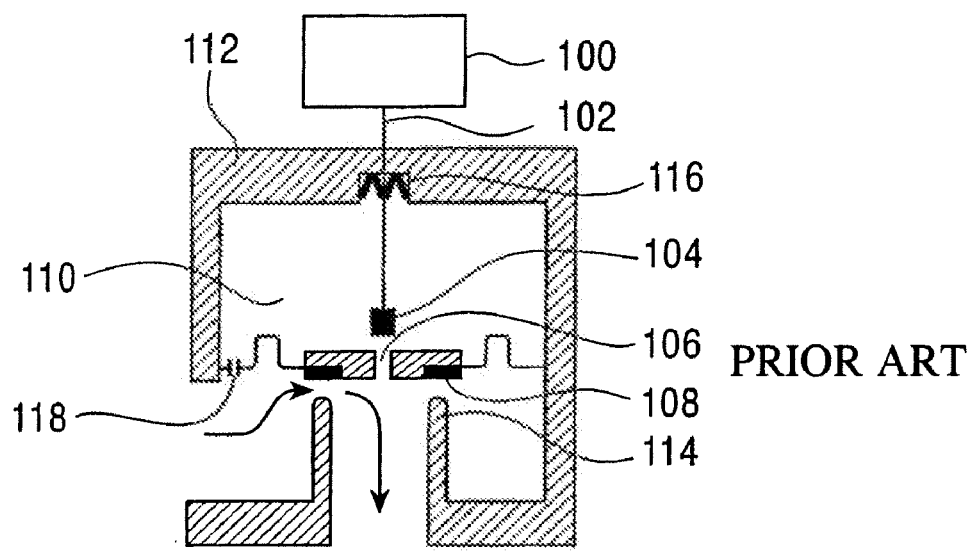
FIG. 19 is a schematic diagram showing one example of conventional pilot-controlled switching valve assemblies.

Further, in the conventional valve assemblies in FIGS. 19 and 20, if the shower push button 10 or another push button is strongly pressed so as to rapidly bring the pilot valve 40 into contact with the pilot-valve port 44 to close the pilot valve 40, a load on a diaphragm of the diaphragm main valve 46 will be instantaneously increased to cause a problem about deterioration in durability of the diaphragm. In contrast, according to the first embodiment, the spring constant of the coil spring 42 can be set at a small value to reduce a spring load. Thus, the moving speed of the main valve 46 can be lowered to prevent the occurrence of an instantaneous large load acting on the main valve so as to provide enhanced durability of the diaphragm.

Figure 9:
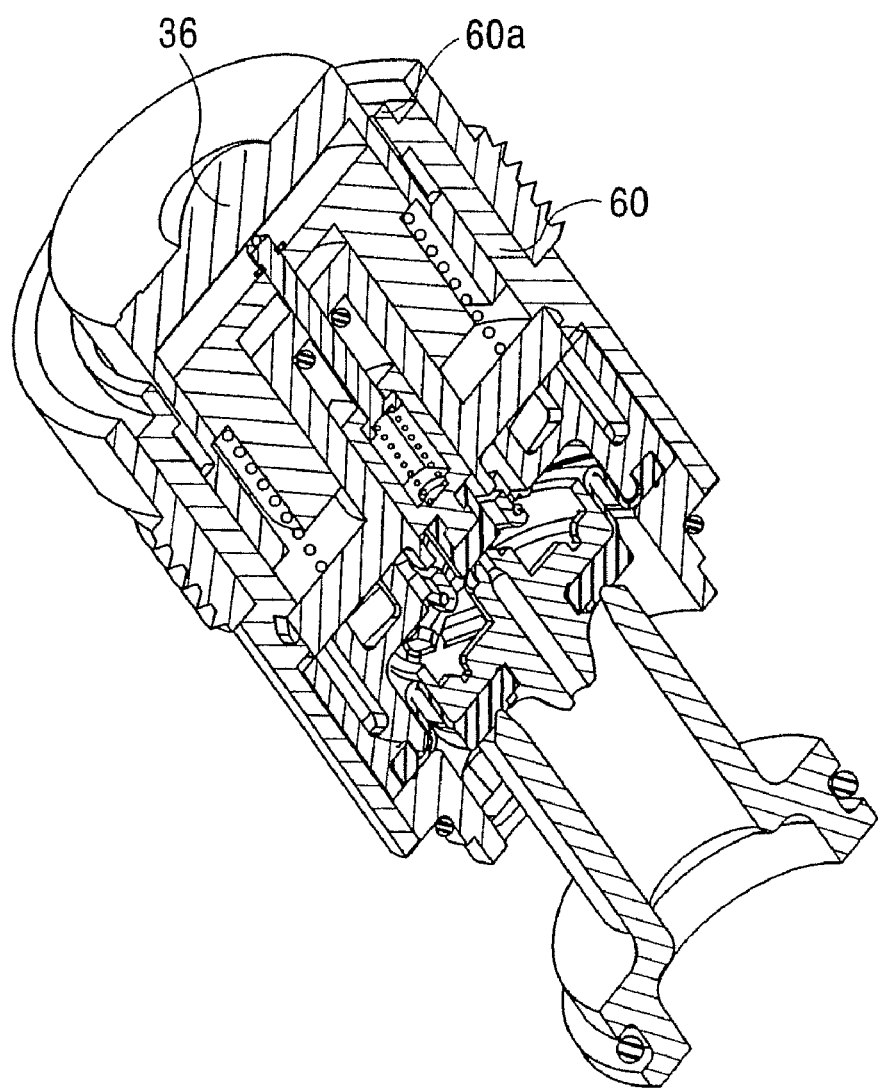
FIG. 9 is a sectional view showing a switching valve unit (pilot-controlled switching valve assembly) according to a second embodiment of the present invention.

With reference to FIG. 9, a second embodiment of the present invention will be described below. A pilot-controlled switching valve assembly according to the second embodiment has an extension portion 60a formed in a top end portion of the assembling nut 60 in contact with the manual operation member 36. This extension portion 60a substantially precludes water from getting through the clearance between the outer peripheral surface of the manual operation member 36 and the extension portion 60a of the assembling nut 60 to provide an enhanced water-resistant function. This can effectively prevent the occurrence of operational defects or abnormal noises during operation due to the pinching of dusts and/or the attachment of scales, and provides enhanced sanitary conditions.

Figure 10:
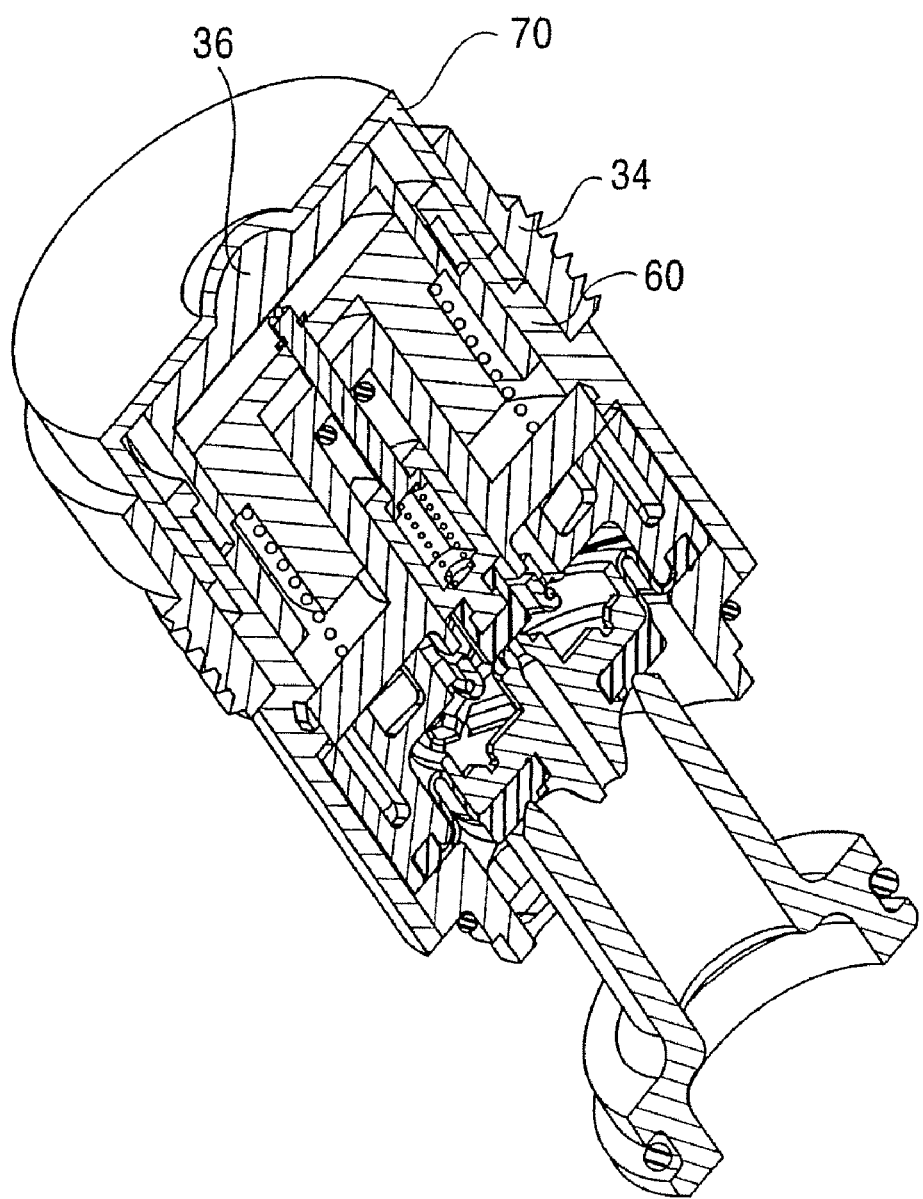
FIG. 10 is a sectional view showing a switching valve unit (pilot-controlled switching valve assembly) according to a third embodiment of the present invention.

With reference to FIG. 10, a third embodiment will be described below. A pilot-controlled switching valve assembly according to the third embodiment is provided with a manual-operation-member cover 70 for covering the top surface and outer peripheral surface of the manual operation member 36. This manual-operation-member cover 70 is fixed to the outer peripheral surface of the manual operation member 36 by the assembling nut 60 and the switching-valve-unit attaching nut 34 (without the extension portion 34*a*).

The manual-operation-member cover 70 substantially precludes water from getting into the switching valve unit to provide an enhanced water-resistant function. This can effectively prevent the occurrence of operational defects or abnormal noises during operation due to the pinching of dust and/or the attachment of scales, and provides enhanced sanitary conditions.

With reference to FIGS. 11 to 18, respective structures of faucet and shower push buttons of a mixing faucet will be specifically described.

Figure 11:
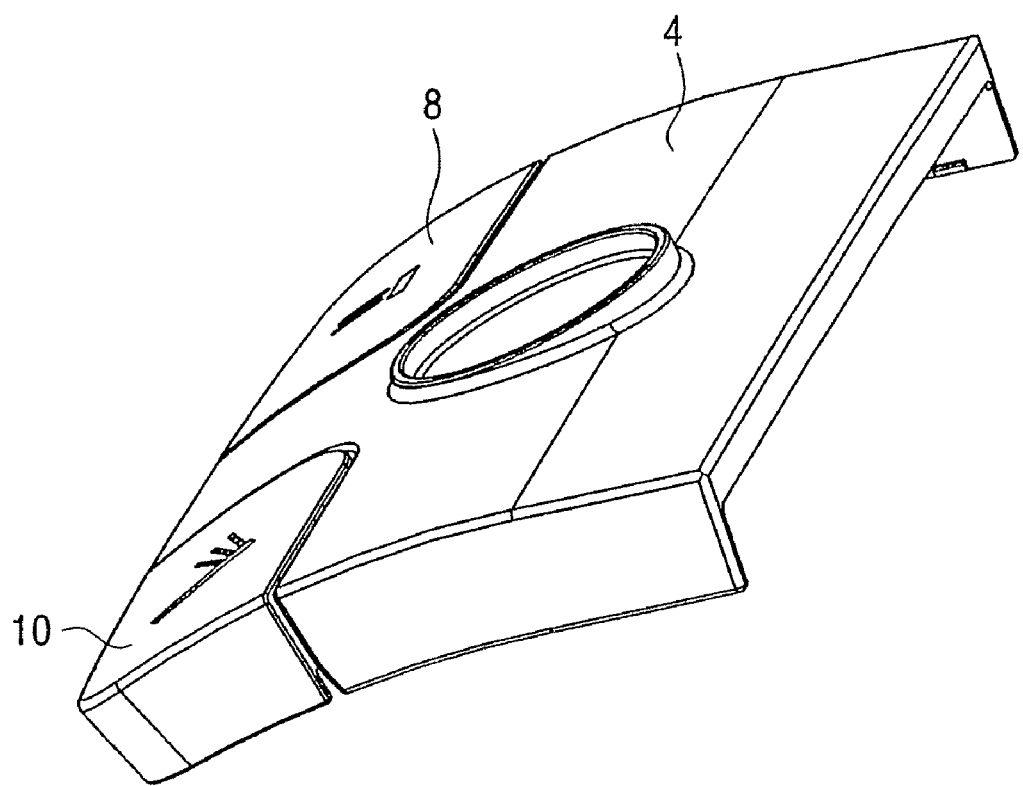
FIG. 11 is a perspective view showing an assembly of a plate-shaped heat-insulating cover, a faucet push button and a shower push button, which are components of the mixing faucet in FIG. 2.
Figure 12:
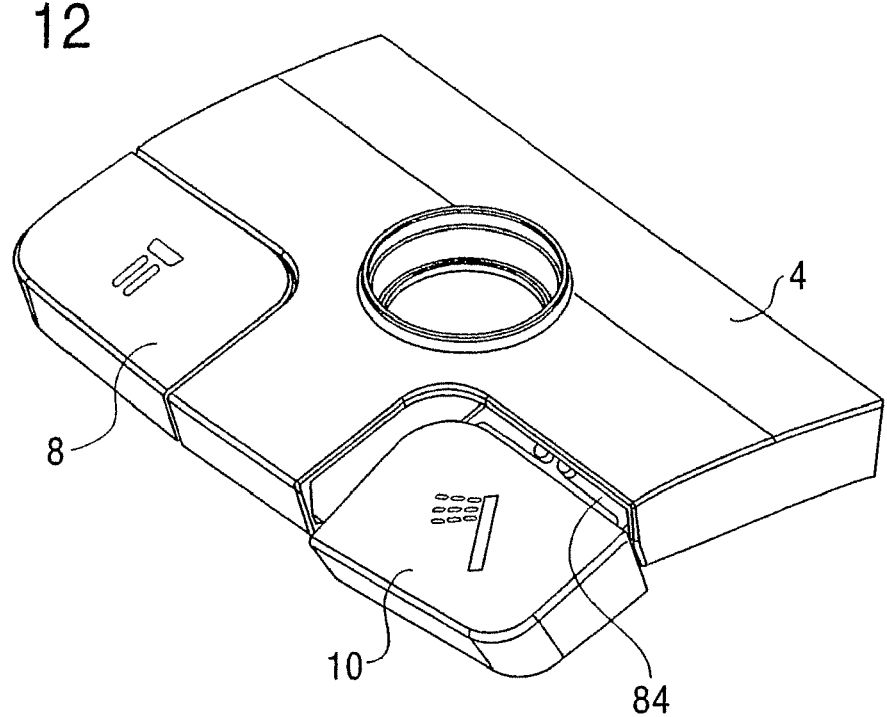
FIG. 12 is a perspective top plan view showing the assembly in FIG. 11, wherein the shower push button is pressed.
Figure 13:
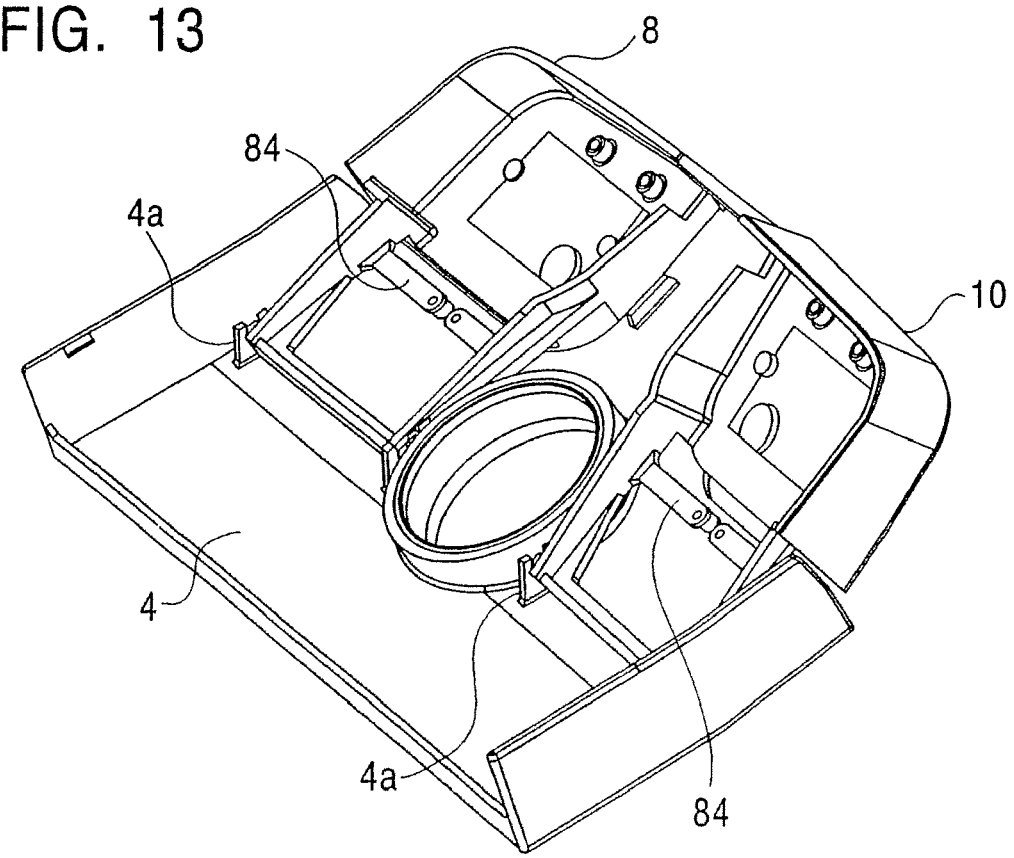
FIG. 13 is a perspective back view showing the assembly in FIG. 12.
Figure 14:
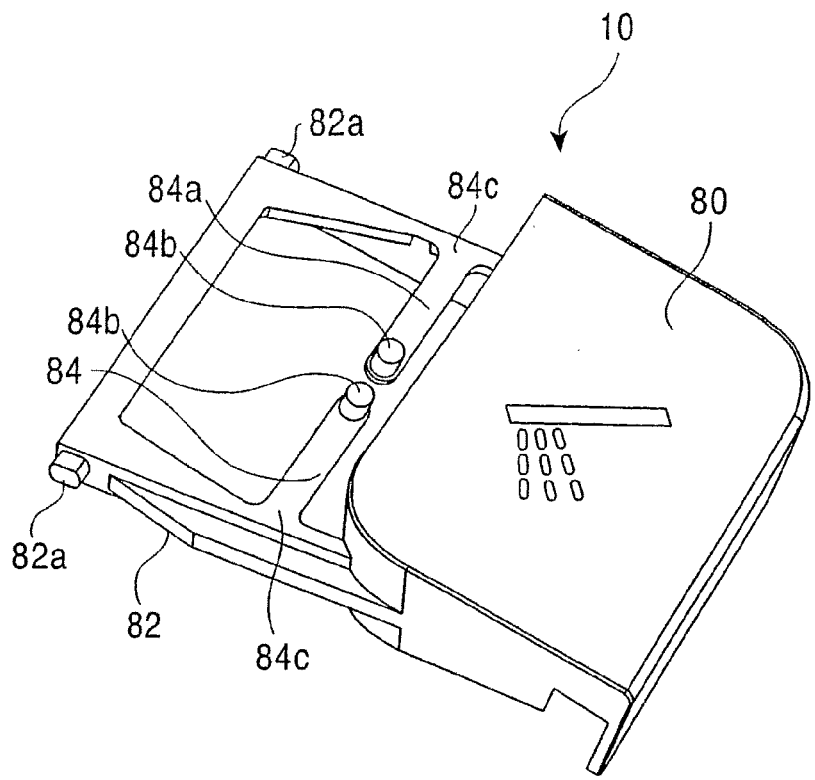
FIG. 14 is a perspective top plan view showing the shower push button.
Figure 15:
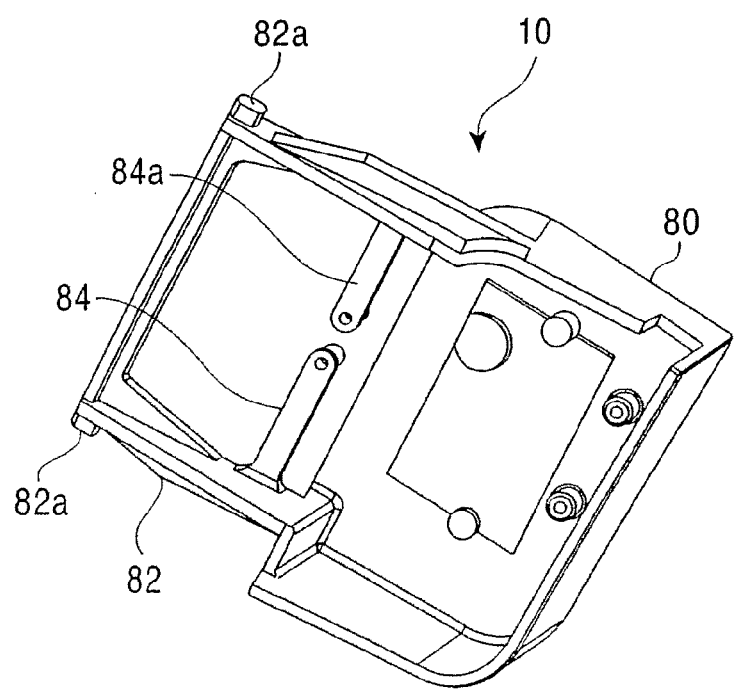
FIG. 15 is a perspective back view showing the shower push button in FIG. 14.

FIG. 11 is a perspective view showing an assembly of the plate-shaped heat-insulating cover 4, the faucet push button 8 and the shower push button 10, which are components of the mixing faucet 1 in FIG. 2. FIG. 12 is a perspective top plan view showing the assembly in FIG. 11, wherein the shower push button 10 is pressed. FIG. 13 is a perspective back view showing the assembly in FIG. 12. FIG. 14 is a perspective top plan view showing the shower push button 10. FIG. 15 is a perspective back view showing the shower push button 10 in FIG. 14. In these figures, the faucet push button 8 and the shower push button 10 have the same structure, and thus the following description will be made regarding only the shower push button 10 as an example.

As shown in FIGS. 11 to 15, the shower push button 10 comprises a button operation portion 80, an arm portion 82 allowing the shower push button 10 to be attached to the heat-insulating cover 4 as a part of the faucet body, and a plate spring portion 84 serving as a biasing device allowing the shower push button 10 to be biased toward the heat-insulating cover 4. The button operation portion 80, the arm portion 82 and the plate spring portion 84 are integrally formed in a single piece, and made of polypropylene.

Opposite sides of a distal end of the arm portion 82 are formed, respectively, with a pair of attaching protrusions 82*a*. Each of the attaching protrusions 82*a* is adapted to be fitted into a corresponding one of concave portions of an attaching flange 4*a* formed in the heat-insulating cover 4 so that the arm portion 82 is attached to the heat-insulating cover 4. In the state after the assembling, the shower push button 10 is swingable about the concave portions of the flange 4*a* of the heat-insulating cover 4.

The plate spring portion 84 of the shower push button 10 has a pair of elastically deformable regions 84*a* each having a base end joined to the arm portion 82, and a pair of engagement regions 84*b* each formed at a distal end of the corresponding deformable region 84*a*. A joined position 84*c* between the plate spring portion 84 and the arm portion 82 is set to maximize a distance from the protrusion 82*a* of the arm portion 82 (or at a position close to the button operation portion 80). Thus, when the plate spring portion 84 is pressed on the back surface of the heat-insulating cover 4, a large force acts on the plate spring portion 84 to facilitate elastic deformation in the deformable regions.

An operational process of the shower push button 10 will be described below. The switching valve units 30, 32 (FIG. 2 shows only the switching valve unit 32) are disposed to be in contact, respectively, with the bottom surfaces of the faucet and shower push buttons 8, 10 of the mixing faucet 1.

Further, as shown in FIG. 4, in the water-stop state (closed state), the manual operation member 36 of the switching valve unit 32 has a top portion 36*a* in contact with the bottom surface of the shower push button 10, and the top portion 36*a* is positioned at a height level L0 by the pilot-valve switching/holding mechanism 62. As shown in FIG. 2, this height level L0 corresponds to a position where the top surface of the shower push button 10 and the top surface (front surface) of the heat-insulating cover 4 have the same height level. The state of the height level L0 corresponds to a position illustrated in FIG. 16(*a*).

As shown in FIG. 5, in the water-discharge state (open state), the top portion 36*a* of the manual operation member 36 of the switching valve unit 32 in contact with the bottom surface of the shower push button 10 is positioned at a height level L1 by the pilot-valve switching/holding mechanism 62. This height level L1 is higher than the height level L0 in FIG. 2 by h1. The state of the height level L1 corresponds to a position illustrated in FIG. 16(*c*).

Figure 16:
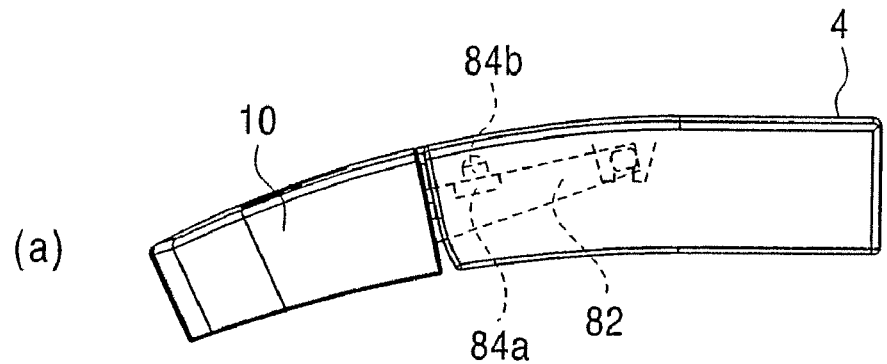
FIGS. 16(a) to (c) are side views showing respective height levels during a user's operation of the shower push button.
Figure 16:
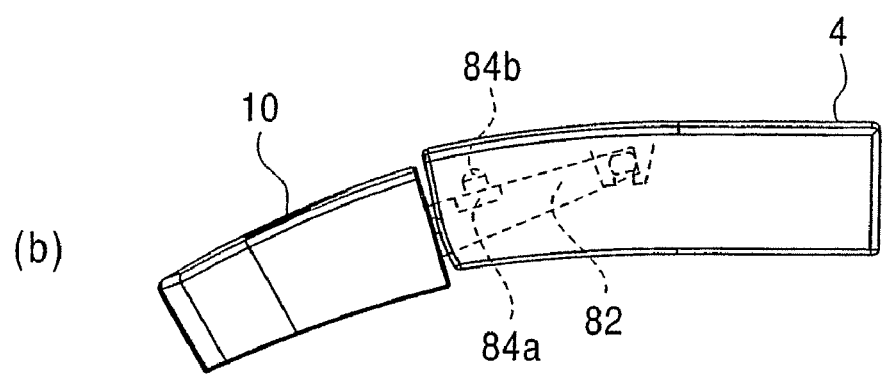
Figure 16:
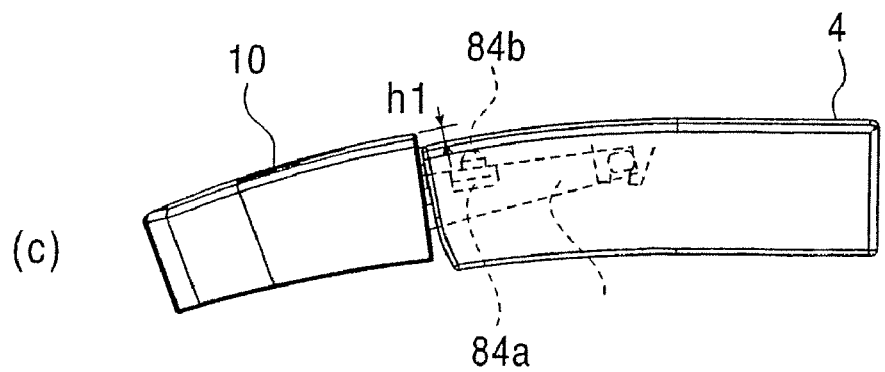

FIGS. 16 (*a*) to (*c*) are side views showing respective height levels during a user's operation of the shower push button 10. FIG. 16(*a*) shows a position in the water-stop (closed) state, where the top surface of the shower push button 10 and the top surface (front surface) of the heat-insulating cover 4 have the same height level.

In this position, the engagement regions 84*b* of the plate spring portion 84 are in non-contact with or in contact slightly with the back surface of the heat-insulating cover 4. This prevents the plate spring portion 84 from generating a biasing force in the water-stop state to avoid the occurrence of permanent deformation therein.

Figure 17:
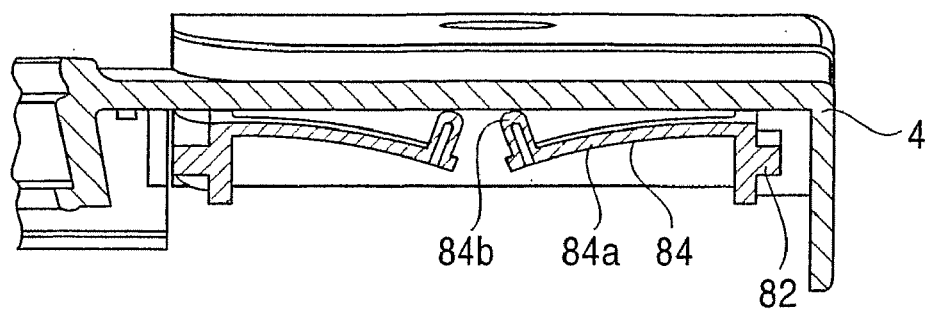
FIG. 17 is a fragmentary front view showing the state after the shower push button is pressed toward a back surface of the heat-insulating cover to cause an elastic deformation in a deformable region of a plate spring portion.

FIG. 16(*b*) shows a position of the shower push button 10 during the course of switching from the water-stop state to the water-discharge state after a user presses the shower push button 10, or in a transient state. FIG. 16(*c*) shows a position of the shower push button 10 after the completion of the water-discharging operation by a user from the position in FIG. 16(*b*). In FIG. 16(*c*), the top surface of the shower push button 10 is located at a higher position than that of the heat-insulating cover 4 by h1. In this position, as shown in FIG. 17, the shower push button 10 is pressed toward the back surface of the heat-insulating cover 4 to cause an elastic deformation in the deformable regions 84*a* of the plate spring portion 84, so as to generate a force allowing the shower push button 10 to be pressed downward toward the switching valve unit.

Thus, when a user perform the water-discharging operation for switching from the water-stop state to the water-discharge state, the shower push button 10 is pressed downward by the plate spring portion 84 to prevent the push button itself from being abnormally moved (vibrated).

Figure 18:
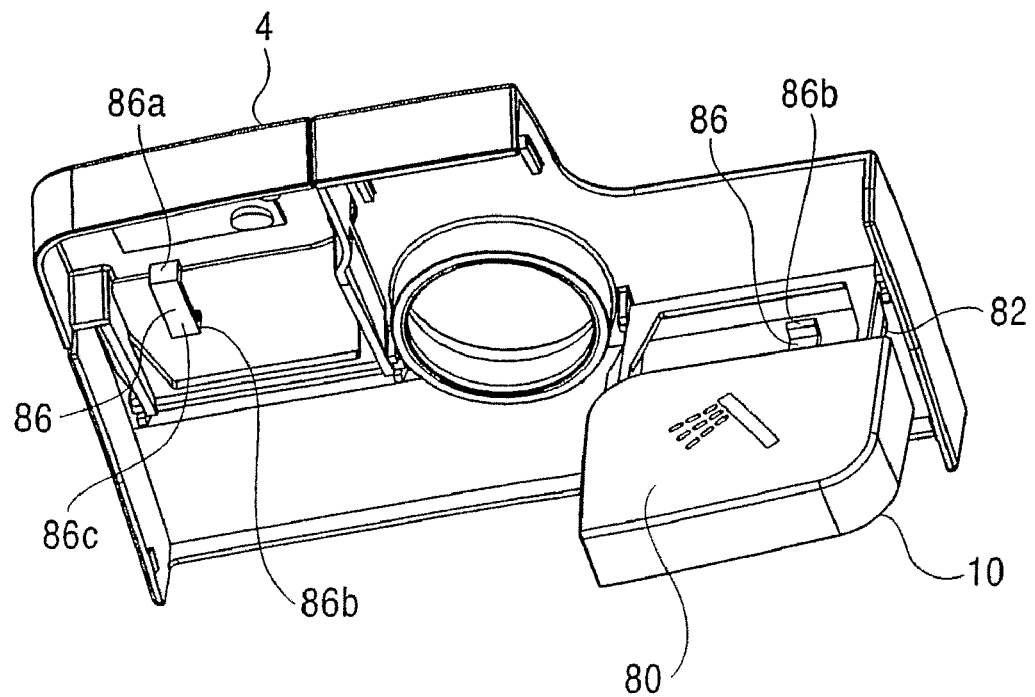
FIG. 18 is a perspective view showing one modification of the structure of a faucet push button and a shower push button in a mixing faucet.

With reference to FIG. 18, one modification of the structure of a faucet push button and a shower push button in a mixing faucet will be described.

As shown in FIG. 18, this shower push button 10 comprises a button operation portion 80, a arm portion 82 allowing the shower push button 10 to be attached to the heat-insulating cover 4, and a plate spring portion 86 allowing the shower push button 10 to be biased toward the heat-insulating cover 4, as in the above embodiment. The plate spring portion 86 in this modification is formed to extend parallel to the arm portion 82. The plate spring portion 86 has a base end 86a joined to the back surface of the operation portion 80 and a distal end 86b pressed onto the back surface of the heat-insulating cover 4. Further, an elastically deformable region 86c is formed between the base end 86a and the distal end 86b. When the top surface of the shower push button 10 is located at a higher position than that of the top surface (front surface) of the heat-insulating cover 4 during the water discharging operation, the shower push button 10 is pressed downward by the elastically deformed deformable region 86c

Thus, when a user performs the water-discharging operation for switching from the water-stop state to the water-discharge state, the shower push button 10 is pressed downward by the plate spring portion 84 to prevent the push button itself from being abnormally moved (vibrated).

As mentioned above, the switching valve unit of the present invention can provide a desirable operational feeling without unevenness in operational force, and can facilitate downsizing.

What is claimed is:

1. A switching valve assembly for use in a mixing faucet operable to mix hot water and cold water at a desired temperature and selectively stop and discharge said mixed water, said switching valve assembly comprising:
   a manual operation member adapted to be moved in response to a pressing operation by a user;
   a push rod member having a base end joined to said manual operation member;
   a pilot valve disposed relative to a distal end of said push rod member;
   a buffer device interposed between said pilot valve and said distal end of said push rod member;
   a diaphragm main valve having a pilot-valve port designed such that said pilot valve is selectively brought into contact therewith and separated therefrom;
   a pressure chamber formed on the side of a back surface of said main valve to contain a part of said push rod member, said pilot valve and said buffer device; and
   a valve seat designed such that a front surface of said main valve is selectively seated thereon and unseated therefrom.

2. The switching valve assembly according to claim 1, wherein said buffer device is a coil spring having a spring constant of 0.01 to 2 N/mm.

3. The switching valve assembly according to claim 1, wherein said buffer device is a coil spring having a spring constant of 0.01 to 0.75 N/mm.

4. The switching valve assembly according to claim 1, wherein said buffer device is a coil spring having a spring constant of 0.01 to $P_1 d^2 \pi/(4\delta)$ N/mm, wherein $\delta$ is the amount of deflection (mm) of said coil spring, $P_1$ is a water pressure (MPa), and d is the diameter (mm) of a rod portion of said push rod member.

5. The switching valve assembly according to claim 1, wherein said push rod member is formed to have a smaller diameter than that of said pilot-valve port.

6. The switching valve assembly according to claim 1, wherein said push rod member is made of stainless steel.

7. The switching valve assembly according to claim 1, which further includes a pilot-valve switching/holding mechanism operable to selectively switch said pilot valve between a water-stop position and a water-discharge position in conjunction with the movement of said manual operation member and hold said pilot valve in either one of said water-stop position and said water-discharge position, said pilot-valve switching/holding mechanism having a heart cam structure.

8. The switching valve assembly according to claim 1, wherein said mixing faucet comprises a faucet body, a faucet push button for discharging the mixed water directly from a faucet, and a shower push button for discharging the mixed water from a shower, each of said faucet and shower push buttons having a biasing device adapted to press said push button downward when said push button is located in a water-discharge position and above a top surface of said faucet body.

9. A switching valve assembly comprising:
   a manual operation member adapted to be moved in response to a pressing operation by a user;
   a push rod member having a base end joined to said manual operation member;
   a pilot valve disposed relative to a distal end of said push rod member;
   a buffer device interposed between said pilot valve and said distal end of said push rod member;
   a diaphragm main valve having a pilot-valve port designed such that said pilot valve is selectively brought into contact therewith and separated therefrom;
   a pressure chamber formed on the side of a back surface of said main valve to contain a part of said push rod member, said pilot valve and said buffer device; and
   a valve seat designed such that a front surface of said main valve is selectively seated thereon and unseated therefrom.

10. The switching valve assembly according to claim 2, wherein said push rod member is made of stainless steel.

11. The switching valve assembly according to claim 2, which further includes a pilot-valve switching/holding mechanism operable to selectively switch said pilot valve between a water-stop position and a water-discharge position in conjunction with the movement of said manual operation member and hold said pilot valve in either one of said water-stop position and said water-discharge position, said pilot-valve switching/holding mechanism having a heart cam structure.

12. The switching valve assembly according to claim 2, wherein said mixing faucet comprises a faucet body, a faucet push button for discharging the mixed water directly from a faucet, and a shower push button for discharging the mixed water from a shower, each of said faucet and shower push buttons having a biasing device adapted to press said push button downward when said push button is located in a water-discharge position and above a top surface of said faucet body.

13. The switching valve assembly according to claim 4, wherein said push rod member is made of stainless steel.

14. The switching valve assembly according to claim 4, which further includes a pilot-valve switching/holding mechanism operable to selectively switch said pilot valve between a water-stop position and a water-discharge position in conjunction with the movement of said manual operation member and hold said pilot valve in either one of said water-stop position and said water-discharge position, said pilot-valve switching/holding mechanism having a heart cam structure.

15. The switching valve assembly according to claim 4, wherein said mixing faucet comprises a faucet body, a faucet push button for discharging the mixed water directly from a faucet, and a shower push button for discharging the mixed water from a shower, each of said faucet and shower push buttons having a biasing device adapted to press said push button downward when said push button is located in a water-discharge position and above a top surface of said faucet body.

16. The switching valve assembly according to claim 5, which further includes a pilot-valve switching/holding mechanism operable to selectively switch said pilot valve between a water-stop position and a water-discharge position in conjunction with the movement of said manual operation member and hold said pilot valve in either one of said water-stop position and said water-discharge position, said pilot-valve switching/holding mechanism having a heart cam structure.

17. The switching valve assembly according to claim 5, wherein said mixing faucet comprises a faucet body, a faucet push button for discharging the mixed water directly from a faucet, and a shower push button for discharging the mixed water from a shower, each of said faucet and shower push buttons having a biasing device adapted to press said push button downward when said push button is located in a water-discharge position and above a top surface of said faucet body.

18. The switching valve assembly according to claim 7, wherein said mixing faucet comprises a faucet body, a faucet push button for discharging the mixed water directly from a faucet, and a shower push button for discharging the mixed water from a shower, each of said faucet and shower push buttons having a biasing device adapted to press said push button downward when said push button is located in a water-discharge position and above a top surface of said faucet body.

* * * * *